United States Patent
Mendelson

(10) Patent No.: US 12,530,702 B2
(45) Date of Patent: Jan. 20, 2026

(54) SYSTEM AND METHOD FOR TRACKING GUESTS OR COLLECTING FEEDBACK FOR AN ENTERTAINMENT ATTRACTION

(71) Applicant: WHITEWATER WEST INDUSTRIES LTD., Richmond (CA)

(72) Inventor: Aaron Mendelson, Longmont, CO (US)

(73) Assignee: WHITEWATER WEST INDUSTRIES LTD., Richmond (CA)

( * ) Notice: Subject to any disclaimer, the term of this patent is extended or adjusted under 35 U.S.C. 154(b) by 0 days.

(21) Appl. No.: 18/530,078

(22) Filed: Dec. 5, 2023

(65) Prior Publication Data

US 2024/0135399 A1   Apr. 25, 2024

Related U.S. Application Data

(63) Continuation of application No. 15/387,090, filed on Dec. 21, 2016, now Pat. No. 11,869,022, which is a
(Continued)

(51) Int. Cl.
*G06Q 30/0203* (2023.01)
*G06K 7/10* (2006.01)
(Continued)

(52) U.S. Cl.
CPC ..... *G06Q 30/0203* (2013.01); *G06K 7/10366* (2013.01); *G06Q 30/0217* (2013.01);
(Continued)

(58) Field of Classification Search
CPC ........... G06Q 30/0203; G06Q 30/0217; G06Q 30/0241; G06K 7/10366; H04W 4/021; H04W 4/50; Y10T 137/0324
See application file for complete search history.

(56) References Cited

U.S. PATENT DOCUMENTS 6,007,338 A  12/1999  DiNunzio et al.
6,529,786 B1  3/2003  Sim
(Continued)

FOREIGN PATENT DOCUMENTS

WO  WO-03107246 A1 * 12/2003  ............ G06Q 30/02
WO  2014075028 A1  5/2014
WO  2017106972 A1  6/2017

OTHER PUBLICATIONS

Reed L., "GDC 2001: Interactive Theme Park Rides", https://www.gamedeveloper.com/design/gdc-2001-interactive-theme-park-rides#close-modal, Jul. 3, 2001, 10 Pages.
(Continued)

*Primary Examiner* — Quan Zhen Wang
*Assistant Examiner* — Mancil Littlejohn, Jr.
(74) *Attorney, Agent, or Firm* — Buchalter, a Professional Corporation

(57) ABSTRACT

A system for tracking guests and collecting feedback for an entertainment attraction. The system may determine a guest's position and may interact with the guest via user interface provided for example via application on mobile device or kiosk, in order to assess guest satisfaction before, during and after attendance at an entertainment attraction or amusement park. The system may allow for storing the guest feedback and may determine whether to issue a reward to the guest based upon the feedback provided. The system may be positioned proximate to a queue line for an entertainment attraction, and may capture an image of a guest to determine the perceived mood of the guest and thereby determine whether to issue a reward to the guest based upon the perceived mood of the guest. Guest interfaces may allow communication or other data presented between or to guests.

20 Claims, 12 Drawing Sheets

Related U.S. Application Data continuation-in-part of application No. 14/077,009, filed on Nov. 12, 2013, now Pat. No. 10,516,969.

(60) Provisional application No. 62/270,410, filed on Dec. 21, 2015, provisional application No. 61/724,853, filed on Nov. 9, 2012.

(51) Int. Cl.
| | |
|---|---|
| *G06Q 30/0217* | (2023.01) |
| *G06Q 30/0241* | (2023.01) |
| *H04W 4/021* | (2018.01) |
| *H04W 4/50* | (2018.01) |

(52) U.S. Cl.
CPC ........ *G06Q 30/0241* (2013.01); *H04W 4/021* (2013.01); *H04W 4/50* (2018.02); *Y10T 137/0324* (2015.04)

(56) References Cited

U.S. PATENT DOCUMENTS

| | | |
|---|---|---|
| 6,889,098 B1 | 5/2005 | Laval et al. |
| 7,749,089 B1 | 7/2010 | Briggs et al. |
| 8,082,165 B2 | 12/2011 | Natsuyama et al. |
| 8,775,244 B2 | 7/2014 | Boss et al. |
| 10,516,969 B2 | 12/2019 | Heaven et al. |
| 11,869,022 B2 | 1/2024 | Heaven et al. |
| 2001/0029483 A1 | 10/2001 | Schultz et al. |
| 2002/0116266 A1 | 8/2002 | Marshall |
| 2003/0195808 A1 | 10/2003 | Brown et al. |
| 2005/0278215 A1 | 12/2005 | Seele Jr. |
| 2007/0207857 A1 | 9/2007 | Angell et al. |
| 2007/0225911 A1 | 9/2007 | Chanick |
| 2008/0133283 A1 | 6/2008 | Backer et al. |
| 2008/0267101 A1 | 10/2008 | Webb et al. |
| 2008/0267107 A1 | 10/2008 | Rosenberg |
| 2009/0048878 A1 | 2/2009 | Metcalf |
| 2009/0104920 A1 | 4/2009 | Moon et al. |
| 2009/0138342 A1* | 5/2009 | Otto .................. G06Q 30/02 706/45 |
| 2009/0210145 A1 | 8/2009 | Amano |
| 2009/0291672 A1 | 11/2009 | Treves et al. |
| 2010/0063854 A1 | 3/2010 | Purvis et al. |
| 2010/0277276 A1* | 11/2010 | Bayne .................. G07C 9/27 340/5.21 |
| 2013/0024203 A1 | 1/2013 | Flores et al. |
| 2013/0332509 A1 | 12/2013 | Schwartz et al. |
| 2014/0132400 A1 | 5/2014 | Heaven et al. |
| 2014/0135137 A1 | 5/2014 | Heaven et al. |
| 2014/0249866 A1 | 9/2014 | Popkey et al. |
| 2014/0378211 A1* | 12/2014 | Gala .................. G07F 17/3244 463/25 |
| 2015/0154614 A1 | 6/2015 | Sullivan et al. |
| 2015/0193806 A1* | 7/2015 | Tarailo .............. G06Q 30/0217 705/14.19 |
| 2016/0055429 A1 | 2/2016 | Schwartz |
| 2016/0350787 A1* | 12/2016 | Taylor ................ G06Q 10/087 |
| 2017/0169449 A1 | 6/2017 | Heaven et al. |

OTHER PUBLICATIONS

Schmidt C., "Extreme Queue Makeovers Lining up at Walt Disney World", https://www.silive.com/goofy_about_disney/2011/04/extreme_queue_makeovers_lining_up_at_disney_parks.html, Apr. 20, 2011, 6 Pages.

Office Action for Canadian Application No. 3173289 dated Dec. 1, 2023, 3 pages.

Office Action for Canadian Application No. 3173289 dated Jul. 17, 2025, 3 pages.

TouringPlans, "Lines TouringPlans", YouTube, https://www.youtube.com/watch?v=ig0KRIOUP80, Dec. 31, 2011, 1 Page.

\* cited by examiner

SYSTEM AND METHOD FOR TRACKING GUESTS OR COLLECTING FEEDBACK FOR AN ENTERTAINMENT ATTRACTION

CROSS REFERENCE TO RELATED APPLICATIONS

This application claims the benefit of U.S. Provisional Patent Application Ser. No. 62/270,410, filed on Dec. 21, 2015, entitled "System and Method for Tracking Guests and Collecting Real-Time Feedback from Guests Experiencing an Entertainment Attraction," which is incorporated by reference in its entirety. This application is also a continuation of U.S. Application No. 15/387,090, filed on Dec. 21, 2016, which is a continuation-in-part of Nonprovisional patent application Ser. No. 14/077,009, filed on Nov. 11, 2013, now U.S. Pat. No. 10,516,969, which claims the benefit of U.S. Provisional Patent Application Ser. No. 61/724,853, filed on Nov. 9, 2012.

BACKGROUND

1. Field

The present invention relates generally to software applications and/or tracking systems or methods. More particularly, the present invention relates to mobile software applications related to a waterpark or an amusement park and their attractions and/or a system or method for tracking and/or collecting real-time feedback from guests while the guests are experiencing an entertainment attraction such as a ride at an amusement park or waterpark.

2. Description of the Related Art

Amusement parks and waterparks provide patrons with a wide range of possible entertainment activities or attractions, typically spread across a large plot of real estate due to the size and footprint required for the construction of the various rides or venues. Amusement parks, water parks and similar entertainment venues require extensive planning and huge financial investments to develop and operate. The primary objectives of the entertainment venues are to attract large numbers of guests, entertain the guests and generate profit.

Many families or visitors are required to expend time and effort prior to arriving at the park in identifying the types of rides, restaurants, or other attractions they wish to visit, particularly at larger parks where it is not possible to attend every attraction that is available within one day's time. In many cases, patrons must select the rides they most wish to attend during their visit, since even identification of all the attractions of interest may not suitably limit the attractions that time at the park permits. This can be an even greater issue during peak periods such as holidays and other common vacation timeframes since the population of visitors at the park rises substantially.

As smart phones, tablets, and other portable electronic devices become more common among adults and children, software applications for execution upon such devices (e.g., mobile applications) have become an increasingly popular pastime for users. Mobile applications have been developed as both games, productivity tools, and for a variety of educational capacities. Certain software applications have also been developed by companies to help inform or advertise to consumers about the products or services that are offered or available for consumption. For amusement parks, mobile applications have been developed that provide users with a listing of the attractions available, photographs of the attractions, and have included brief descriptions of these attractions for helping a user get acquainted with features of the park. Unfortunately, while these mobile applications provide users with some minimal educational value, such as overhead map views of the park, they generally do not provide any added convenience, help, or entertainment to a user when they are already present at the park. Indeed, once visiting the park, these mobile applications do not serve much, if any, additional purpose to the user.

Thus, a mobile application for amusement parks or waterparks that allows increased convenience to a user in selecting among rides, vendors, restaurants, attractions, or the like, particularly when already within the park, would be desirable. The mobile application would ideally be capable of identifying rides or other attractions of particular interest to a user, direct or navigate the user accordingly, and provide additional information to the user about the park that is more accurately keyed to the particular user while in the park. The mobile application would also ideally be capable of improving the user experience of a visitor in the park with time-saving or other entertainment features that allow the user to better allocate their time when within the park borders. Moreover, the mobile application would ideally be capable of tracking various user statistics, either for display to the user or for transmittal to a system of the amusement park or waterpark.

It would also be advantageous to develop a system and method for tracking guests and collecting real-time feedback from guests as guests are experiencing the entertainment attractions within the entertainment venue. The feedback can then be evaluated by entertainment venue designers and operators to better determine how to successfully build and operate the entertainment venues and attractions.

SUMMARY

A mobile application for providing information to a user about an amusement park or water park is disclosed. The disclosed mobile application may also be used for a wide variety of entertainment or convenience aspects based upon user participation or interaction with the mobile application, such as provision of discounts on park items, provision of vouchers or permission to move forward in a queue or line for a ride, dynamic alteration of one or more features of a water or amusement ride based upon satisfaction of certain objectives of an entertainment activity of the mobile application, etc.

In one embodiment, a method of providing information to a user about an amusement park via a mobile application configured to be executed by an electronic device may include the steps of determining a first attraction for participation thereon by the user, determining a position of the electronic device, searching for the first attraction within a predetermined area from the position of the electronic device, determining a wait time for the first attraction if the attraction is within the predetermined area, and navigating the user to the first attraction if the wait time for the first attraction is less than a first wait time.

In another embodiment, a method of providing information to a user regarding an amusement park, the method comprising the steps of providing a mobile application configured to be executed by a processor of a mobile device, determining, using the processor, a first attraction for participation thereon by the user, determining, using the processor, a geographic position of the mobile device, determining, using the processor, a distance of the first attraction from the geographic position of the mobile device, determining, using the processor, a first parameter corresponding to the first attraction if the distance of the first attraction from the geographic position of the mobile device is less than a first threshold, and navigating, using the processor, the user to the first attraction.

In another embodiment, a method of providing information to a user regarding an amusement park via a mobile application configured to be run by an electronic device may include the steps of determining a first characteristic representing the user, determining a second characteristic representing participation in the amusement park by the user, generating a list of attractions based upon the first characteristic and the second characteristic, generating a modified list of attractions from the list of attractions based upon input received by the user, generating an attraction sequence for the modified list of attractions, and navigating the user around the amusement park based upon the attraction sequence for the modified list of attractions.

In yet another embodiment, a method of providing information to a user about an amusement park, the method comprising the steps of providing a mobile application configured to be executed by a processor of a mobile device, determining, using the processor, a first characteristic corresponding to the user, determining, using the processor, a plurality of attractions for the user to participate thereon based upon the first characteristic, determining, using the processor, a response option corresponding to participation on the plurality of attractions, and navigating, using the processor, the user to the plurality of attractions based upon the response option.

In still another embodiment, a method of providing information to a user regarding an amusement park via a mobile application configured to be executed by an electronic device may include the steps of determining a position of the electronic device, determining if a vendor is located within a predetermined area of the position of the electronic device, and providing a first notification to the user of a discount available at the vendor if the vendor is within the predetermined area of the position of the electronic device.

In yet another embodiment, a method of dynamically adjusting a feature of an amusement ride based on a software application may include the steps of providing a software application for execution upon an electronic device, displaying an entertainment activity of the software application for interaction by a user of the electronic device, determining if the user has satisfied an objective of the entertainment activity of the software application based on the interaction by the user of the electronic device, and modifying a feature of the amusement ride if the user has satisfied the objective of the entertainment activity.

In still another embodiment, a method of adjusting a waterslide attraction may include the steps of providing a software application for execution by a processor of an electronic device, receiving input from the user via the electronic device, and modifying a feature of the waterslide attraction while a rider slides on the waterslide attraction based upon the input received from the user. The feature may include a volume of water (e.g., from water jets that spray or otherwise flow on the waterslide to slow down or speed up the rider), a plate (e.g., made of metal that acts in conjunction with electric and/or magnetic fields to exhibit a force upon the rider to slow down or speed up the rider), a queue or line (e.g., that a potential rider waits in before traveling upon a sliding surface of the waterslide attraction that may be dynamically adjusted for the potential rider by moving the rider forward or backward within the queue), etc.

In another embodiment, a mobile application for a waterslide attraction may include computer-readable instructions configured to be executed by a processor of a mobile device, the instructions configured to determine, using the processor, a first attraction for participation thereon by a user, determine, using the processor, a geographic position of the mobile device, determine, using the processor, a distance of the first attraction from the geographic position of the mobile device, determine, using the processor, a first parameter corresponding to the first attraction if the distance of the first attraction from the geographic position of the mobile device is less than a first threshold, and navigate, using the processor, the user to the first attraction.

In another embodiment, the present invention may involve tracking guests from the moment guests enter an attraction to the moment guests exit the attraction. Tracking guests may be accomplished using any number of technologies including biometric data acquisition, RFID hardware and software, long distance radio frequency hardware and software, bar codes and readers, photo cells, GPS, near field communications and numerous other types. Tracking guests allows data relative to the dispatch rates and queue line wait times to be calculated, recorded and analyzed. Tracking guests within an entertainment venue may also be more extensive (e.g., remote from attraction areas).

In another embodiment, the present invention may involve collecting feedback from guests while guests are experiencing the attraction from entrance to exit. The feedback may be collected via guest interfaces populating the attraction area and/or attraction and which are configured to accept guest feedback. For example, in the queue line, after the attraction concludes and/or during the operation of the attraction, guests can use the interface to rate or otherwise provide a level of satisfaction (e.g., happy, so-so, sad) with the attraction.

In one embodiment, a system for tracking a guest may include a first sensor positioned in range of a first area of an entertainment attraction, a second sensor positioned in range of a second area of the entertainment attraction, a storage device in communication with the first sensor and the second sensor, the storage device configured to store tracking data corresponding to the guest being sensed at the first area by the first sensor and being sensed at the second area by the second sensor, and an interface positioned proximate to the entertainment attraction and configured to be interacted with by the guest.

In one embodiment, a system for tracking a guest may include a sensor positioned in range of a queue line, a storage device in communication with the sensor, the storage device configured to store data corresponding to the guest being sensed by the sensor, a processor in communication with the storage device, the processor configured to determine an elapsed time that the guest was in the queue line based upon the data corresponding to the guest being sensed by the sensor, and a kiosk having a touch screen for interaction by the guest.

In one embodiment, a method for tracking a guest may include positioning a first sensor in range of an entrance area of an entertainment attraction, positioning a second sensor in range of an exit area of the entertainment attraction, detecting the guest when the guest is in range of the entrance area via the first sensor, detecting the guest when the guest is in range of the exit area via the second sensor, determining data corresponding to time elapsed from detection of the guest via the first sensor to detection of the guest via the second sensor, transmitting the data for storage, and determining a reward for the guest based upon the data.

The guest interfaces may be further configured to provide in-line entertainment options, retail purchasing options, food and beverage options, social media options and guest-to-guest communication options. Other interactive options are conceivable as disclosed in more detail below.

The embodiments discussed throughout may be suitable for countless entertainment venues including, but not limited to, amusement parks, water parks, cruise ships, sports stadiums, family entertainment centers, casinos, zoos, aquariums and museums. Other variations, embodiments and features of the present invention will become evident from the following detailed description, drawings and claims.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

Figure 1:
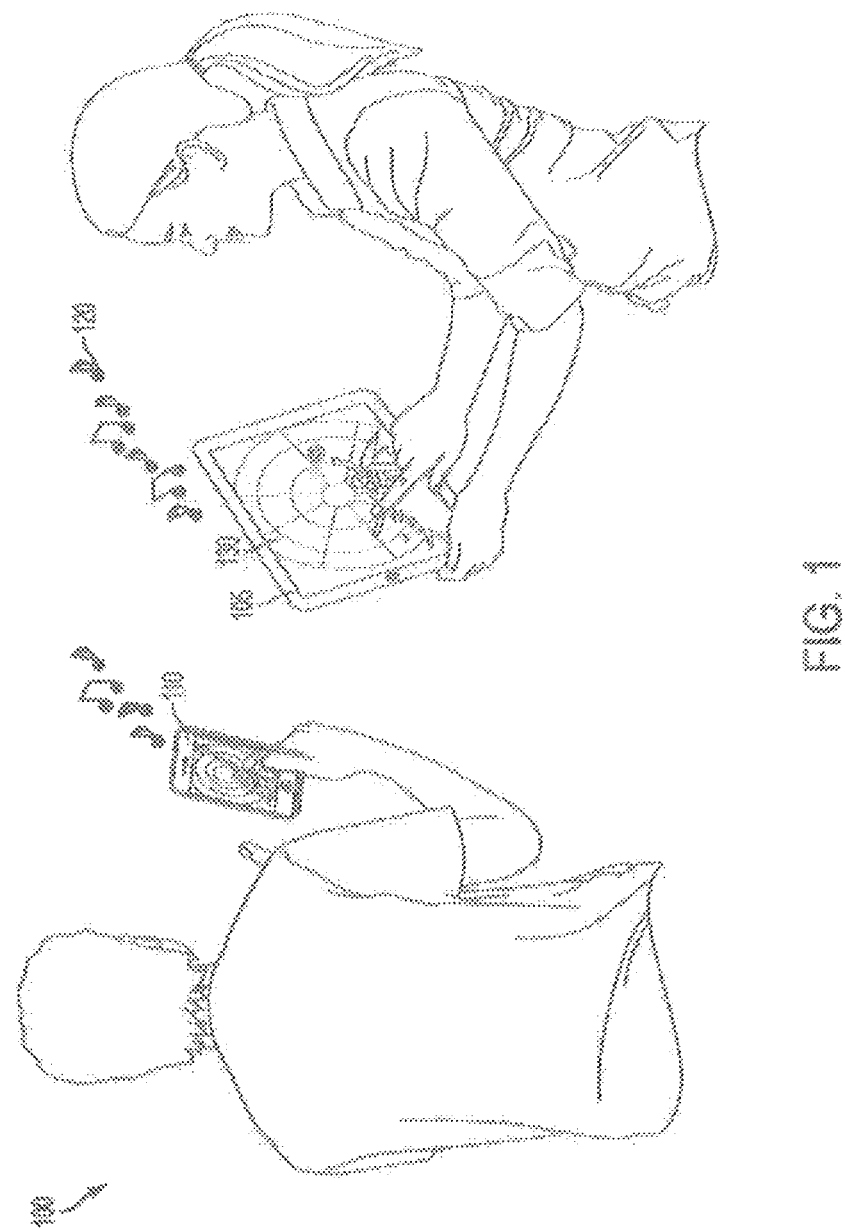
FIG. 1 shows a mobile application corresponding to an amusement park or waterpark in use by a plurality of users according to an embodiment of the present invention.

The detailed description of exemplary embodiments herein makes reference to the accompanying drawings and pictures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Those skilled in the art will recognize that the embodiments of the present invention involve both hardware and software elements which portions are described below in such detail required to construct and operate the system and method according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "computer terminal" should be understood to be any one of a general purpose computer, as for example a personal computer or a laptop computer, a client computer configured for interaction with a server, a special purpose computer such as a server, or a smart phone, tablet computer, personal digital assistant or any other machine adapted for executing programmable instructions in accordance with the description thereof set forth above.

As set forth above, the system and method according to the embodiments of the present invention are suitable for countless entertainment venues. For the sake or brevity, the detailed description herein focuses on a water park venue. Water park venues offer numerous water slide attractions differing in scale, speed, features and the like. Accordingly, the system and method described below are relative to a water slide attraction but are similarly suitable for any other conceivable entertainment attraction. In broad terms, the embodiments of the present invention involve the combination of (i) collecting in real-time an attraction's performance data, guest satisfaction, guest actions to opportunities presented and/or attendant performance and (ii) distilling the collected data for use by park operators and designers and to benchmark the distilled data against comparable attractions.

Turning first to FIG. 1, a mobile application 100 corresponding to an amusement park or waterpark may be installed upon electronic devices, as shown. The mobile application 100 may be configured to be executed on any of a variety of electronic devices, for example, a tablet 105 and/or a smartphone 110. The mobile application 100 may be configured to utilize varying display configurations (e.g., resolution, screen dimensions, fonts, graphics, etc.) based upon the type of electronic device being used. For example, when the mobile application 100 is downloaded and/or used on the tablet 105, additional, larger, or more detailed graphical elements, increased display resolution, and/or larger screen dimensions may be used for displaying the mobile application 100 due to the larger screen size of the tablet 105 when compared against other devices, such as the smartphone 110.

The mobile application 100 is configured to provide various information to a user regarding features or aspects of the amusement park or waterpark, as discussed in greater detail herein. The mobile application 100 may utilize both graphical information 130 and/or audible information 120 to interact with the user. In certain embodiments, the mobile application 100 may additionally or alternatively utilize tactile information (e.g., vibration of the electronic device). The mobile application 100 may interface with a database, stored locally and/or on a remote server, that is configured to store one or more user accounts or profiles. If the database is stored remotely, a user may have access to the account or profile stored in the database and can apply various configurations or settings for the mobile application 100 regardless of the electronic device used in executing the mobile application 100. In a preferred embodiment, the mobile application 100 will be configured to operate in a low power mode when a screen or display of the electronic device is turned off in order to save battery power of the electronic device. Since the user may not be in a position to recharge a battery of the electronic device while using the electronic device at the amusement park or waterpark, efficient management of battery power by the mobile application would be maintained by the low power mode and/or by other battery saving features (e.g., disabling certain graphical effects when the battery level goes below a predetermined threshold).

One of the typical complaints regarding amusement parks or waterparks is the boredom incurred by visitors while waiting in line to ride or participate on an attraction. Particularly for signature rides that entice large amounts of people to the park, it is not uncommon for a visitor to be required to wait upwards of 30-60 minutes in line before participating on the attraction. Having access to a smart phone, tablet, or other electronic device can help ease this boredom while waiting. The mobile application 100 for execution on the electronic device may include entertainment features or activities, such as games or puzzles, for interaction with the user. Moreover, the mobile application 100 may allow for these entertainment features to interact with the attraction itself or the line for the attraction.

For example, the line for the attraction may be dynamic such that users who actively engage in solving puzzles or scoring particularly well in a game of the mobile application 100 are permitted to move ahead in line in front of other individuals (e.g., to the front spot in line or to a separate, expedited line). Separate lines may be established for users who wish to participate in dynamic lines based upon solving puzzles or playing games as part of the mobile application 100 and more traditional lines that do not rely on mobile application 100 participation. In another example, users may engage in games, puzzles, scavenger hunts, or other activities of the mobile application 100 before arriving in a line to win or obtain line bypass awards or vouchers that may be used for various attractions in the park. Any of a variety of benefits or rewards can be provided to users based upon their participation in such games or puzzles, such as discounts at park vendors.

Certain features of the mobile application 100 may be used to affect the attraction itself. For example, a waterslide may include a plurality of dueling slides including various speed-boosting or speed-reducing features (e.g., water jets, magnetic plates, etc.) Users waiting in line to ride the waterslide may interface with the mobile application 100 to enable or disable certain of the speed-boosting or speed-reducing features of the waterslide. In one embodiment, a plurality of lines may be established for a waterslide, each line leading to a separate one of the plurality of dueling slides. Users in line for a first of the dueling slides may participate with a game or puzzle of the mobile application 100 to enable one or more speed-boosting features for the first of the dueling slides, disable one or more speed-reducing features for the first of the dueling slides, or to both enable one or more speed-boosting features for the first of the dueling slides and disable one or more speed-reducing features for the first of the dueling slides, thus helping the participant on the first of the dueling slides travel down in a faster amount of time.

Users in line for the first of the dueling slides may also participate with a game or puzzle of the mobile application 100 to disable one or more speed-boosting features or enable one or more speed-reducing features for the other dueling slides, thereby slowing down the other participants. In this manner, not only is a competition established between the participants of the waterslide engaged in the dueling slides, but a fun and competitive atmosphere is also created for individuals waiting in line.

Rewards may be provided to users who engage in various activities of the mobile application 100. For example, interactive and/or educational content may be provided for a user while at the amusement park or before arrival. Based upon the user's level of mastery of the content (e.g., obtaining a particular score in a game, solving a particular puzzle, learning the most educational information, etc.) rewards may be provided to the user, for example, via a printable or displayable coupon. These rewards may take any of a variety of forms, such as line bypass vouchers, price discount vouchers, passes to access certain areas of the park or tables at a restaurant, etc. If the mobile application 100 is connected with a user profile, either stored locally on the electronic device or on a remote server, the rewards may be listed and/or associated with the user profile. In this manner, users may be permitted to trade or share rewards with other users in order to obtain the various coupons, vouchers, or other rewards that are most desirable to them.

In certain embodiments, the mobile application 100 may provide information, updates, discounts, notifications of special events, etc. to a user even when the user is not currently at the amusement or water park (e.g., when at home or in the car traveling to the amusement or water park). For example, the mobile application 100 may be configured to provide data to the user via push messages, banner notifications, or the like on the electronic device. This data can take the form of general information about park events available to all patrons, or may be customized to specific users based upon their past visitation schedules, types of desired rides, or any other type of characteristic. In another example, such data may be provided to users after their successful completion of an entertainment or education feature of the mobile application 100 even if not currently within the park.

The mobile application 100 may also be configured to allow users to post pictures or photographs taken and processed through the mobile application 100 (e.g., by adding post processing filters, graphics, icons, text, etc.) to a location of the user's choice. Possible locations may be to a social media account (e.g., Facebook, Twitter, Google+) local storage or memory of the electronic device, or cloud-based storage, either via a separate application (e.g., Dropbox, iCloud, etc.) or as part of a storage account associated with a user profile of the mobile application 100. The photographs may also or additionally be provided to an email address for sharing among friends.

Figure 2:
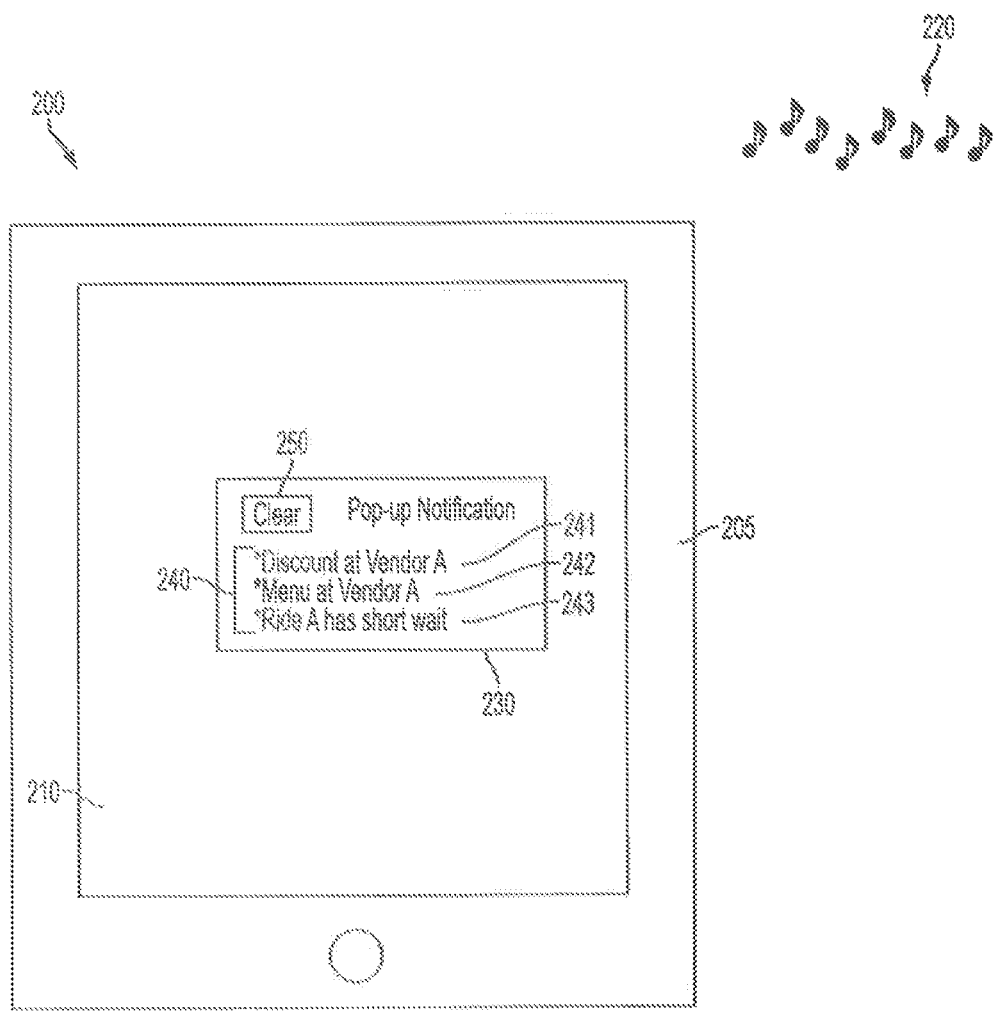
FIG. 2 shows a display screen of a mobile application corresponding to an amusement park or waterpark for displaying one or more notifications to a user according to an embodiment of the present invention.

Various other types of information may be provided or displayed to users of a mobile application in addition or in alternative to the entertainment aspects described above. Turning to FIG. 2, a display screen 200 of a mobile application corresponding to an amusement park or waterpark is shown for displaying one or more notifications to a user. The mobile application may include the same or similar features as previously described. The mobile application may be executed by an electronic device 205 having a display 210. Visual or graphical aspects of the mobile application may be displayed to a user via the display 210. Audible aspects 220 of the mobile application may be generated to the user via a speaker or other sound-emitting component or components of the electronic device 205. Certain embodiments may additionally or alternatively utilize tactile aspects (e.g., vibration of the electronic device).

The mobile application is configured to notify or identify to the user one or more pieces of information based upon a determined location of the mobile application. For example, if the mobile application is being executed upon an electronic device capable of determining geographic positioning, such as through the use of a global positioning system ("GPS"), particular pieces of information may be displayed that are relevant to such geographic positioning. Other manners of determining positioning of the electronic device may be utilized in an alternative embodiment. For example, if the electronic device has a camera or other image capture components, the user may be required to take a photograph of their position or point one or more of the image capture components at a particular location (e.g., at a vendor or attraction of the park, at a barcode upon the ground or upon a nearby sign for scanning, etc.)

In one embodiment and as shown, a popup notification box 230 may appear on the display 210 and include various information 240 therein. The popup notification box 230 may include a first statement 241 indicating that there are discounts available at Vendor A. Vendor A may be any of a variety of vendors, stores, restaurants, or the like that are within a predetermined vicinity of the geographic positioning of the electronic device executing the mobile application.

In one embodiment, the first statement 241 may include additional details or a listing of the various discounts available. In another embodiment, the first statement 241 may be a clickable link or other interactive graphic such that the user of the mobile application may interface with the first statement 241 (e.g., by pressing the display screen 210 at the location of display of the first statement 241) to be presented with another screen or another popup box that includes additional details about the one or more discounts available. In this manner, the popup notification box 230 may provide the user with cursory information about available discounts at one or more nearby vendors and allow the user to indicate which vendors or discounts are of the most interest.

The popup notification box 230 may also include a second statement 242 indicating a menu is available for user review for Vendor B. Like Vendor A, Vendor B may be any of a variety of vendors, stores, restaurants, or the like that are within a predetermined vicinity of the geographic positioning of the electronic device executing the mobile application. The predetermined vicinity used for determining whether to display the second statement 242 may be broader in geographic area than the predetermined vicinity used for determining whether to display the first statement 241. This is because patrons of the park may be more interested in the menus of restaurants that are further away when in search for food than the patrons would be in identifying discounts that are available within their proximity. In an alternative embodiment, the predetermined proximity relating to the second statement 242 may be the same as or smaller than the predetermined vicinity used for the first statement 241. Similarly, like the first statement 241, the second statement 242 may provide additional details about the menu within the notification box 230 or a user may interface with the second statement 242 to obtain such additional details on a further screen or popup box. Any of a variety of other options may be made available to the user via notifications. For example, the user may be notified of nearby restaurants and be presented with options to order food remotely, shorten their wait time in a line at the restaurant, obtain preferred seating at the restaurant, etc.

The popup notification box 230 may additionally include a third statement 243 indicating that Ride A has a wait time less than a predetermined amount of time. Like discussed above for Vendor A and/or Vendor B, Ride A may be any of a variety of rides or features of the amusement park or waterpark within a predetermined vicinity of the geographic positioning of the electronic device executing the mobile application that patrons must queue in line for in order to so ride or attend. In certain embodiments, the user may select or identify particular types of notifications that are desired (e.g., only food-related notifications, etc.) and the mobile application will limit such notifications to only those selected. The user may also or additionally set the predetermined vicinity (either upon loading the mobile application or within a user account or profile accessed by the mobile application) for the provision of such notifications. A graphical button or other element 250 may be included within the popup notification box 230 or displayed elsewhere on the display screen 210 for removing one or more of the notifications displayed in the popup notification box 230.

Figure 3:
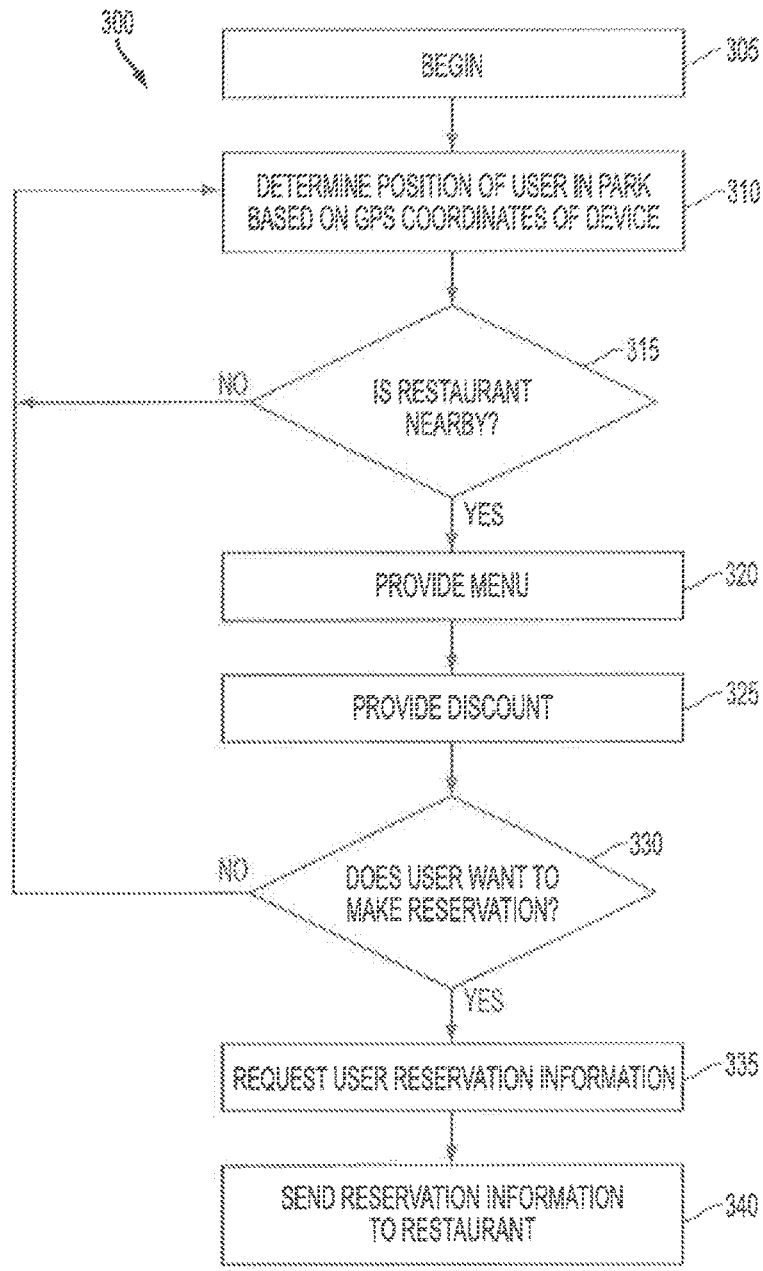
FIG. 3 shows a flowchart of operation of a mobile application corresponding to an amusement park or waterpark for displaying notifications to a user based upon geographic location according to an embodiment of the present invention.

FIG. 3 shows a flowchart of operation of a mobile application 300 corresponding to an amusement park or waterpark for displaying notifications to a user based upon geographic location. The mobile application 300 may include the same or similar features as previously described. At step 305, operation begins. This may occur, for example, upon a user executing the mobile application 300 upon an electronic device. In another embodiment, operation may begin when a user has already loaded the mobile application 300, but subsequently places the mobile application 300 into a particular mode of operation (e.g., notification mode), such as by selecting a menu option or other setting within the mobile application 300. In still another embodiment, operation may begin when a user has already loaded the mobile application 300, but brings the mobile application 300 into focus or to the front of the display screen of the electronic device.

At step 310, the mobile application 300 determines a position of the electronic device being used by the user. This may be performed by determining geographic coordinates for the user based off of GPS elements contained within or interfacing with the electronic device. If the electronic device is a cellular-enabled smartphone or tablet, such geographic coordinates may be determined by interfacing with one or more satellites to determine a precise position of the electronic device. Such a determination may be performed continuously or by including time delays as desired (e.g., a new position determination may occur every 5 minutes). The lower the time delay in determining a position, the more accurate the actual position of the electronic device may be, but at the expense of battery life for the electronic device.

In another embodiment, the user may be required to actively participate in the determination of the positioning. This may be accomplished, for example, by taking a photograph of a surrounding area or nearby landmark with a camera included within or interfacing with the electronic device. Images taken with the camera may be matched by the mobile application 300 with stored images of known locations within the park to determine the positioning of the electronic device. In another example, the user may be required to scan a barcode or other identifying symbol by using the electronic device that may then be read or interpreted by the electronic device and/or the mobile application 300 and compared to stored barcodes or symbols corresponding to known locations within the park.

At step 315, one or more restaurants or other dining facilities or vendors within a predetermined vicinity of the position of the electronic device determined in step 310 are determined. This may be accomplished by identifying among a list of stored restaurants, dining facilities, or vendors stored as part of the mobile application 300 in a memory of the electronic device, those locations present within a particular geographic radius of the position of the electronic device. The geographic radius may be a default value provided by the mobile application 300. In certain embodiments, the geographic radius may be set or modified by the user in a setting or option of the mobile application 300. If there are no restaurants or other dining facilities or vendors located within the predetermined vicinity of the electronic device, operation continues back to step 310 for a new determination of positioning.

If there are at least one or more restaurants, dining facilities, or vendors located within the predetermined vicinity, the closest geographical one may be automatically selected by the mobile application for further operation. Alternatively, if there are multiple restaurants, dining facilities, or vendors located within the predetermined vicinity, a list of them may be displayed to the user for the user to select for further operation. Upon selection, operation continues to step 320. At step 320, a menu for the selected restaurant is provided or displayed to the user on the electronic device. At step 325, any available discounts for the selected restaurant are provided or displayed to the user on the electronic device.

At step 330, the mobile application 300 requests whether the user wishes to make a reservation at the restaurant. A list of available reservation times may be displayed to the user for aiding the user in responding. If the user indicates that no reservation at the restaurant is required, operation continues back to step 310. However, if the user does wish to make a reservation, operation continues to step 335 where user reservation information is requested and received by the mobile application 300. For example, this information may include a name for the party, the number of people in the party, a desired time for the reservation, etc. The user may enter this information via the electronic device in response to the request. At step 340, the reservation information received by the mobile application 300 is sent (e.g., wirelessly) to the corresponding restaurant or other remote system or device. Upon such transmittal, a notification or confirmation message may be displayed to the user indicating that the reservation has been completed and/or with a summary of the completed reservation. In an alternative embodiment, any of a variety of other features or options may be made available to the user. For example, the user may select items from a menu and choose a pickup time in order to bypass the line at the restaurant for pickup of their selected food items.

Figure 4:
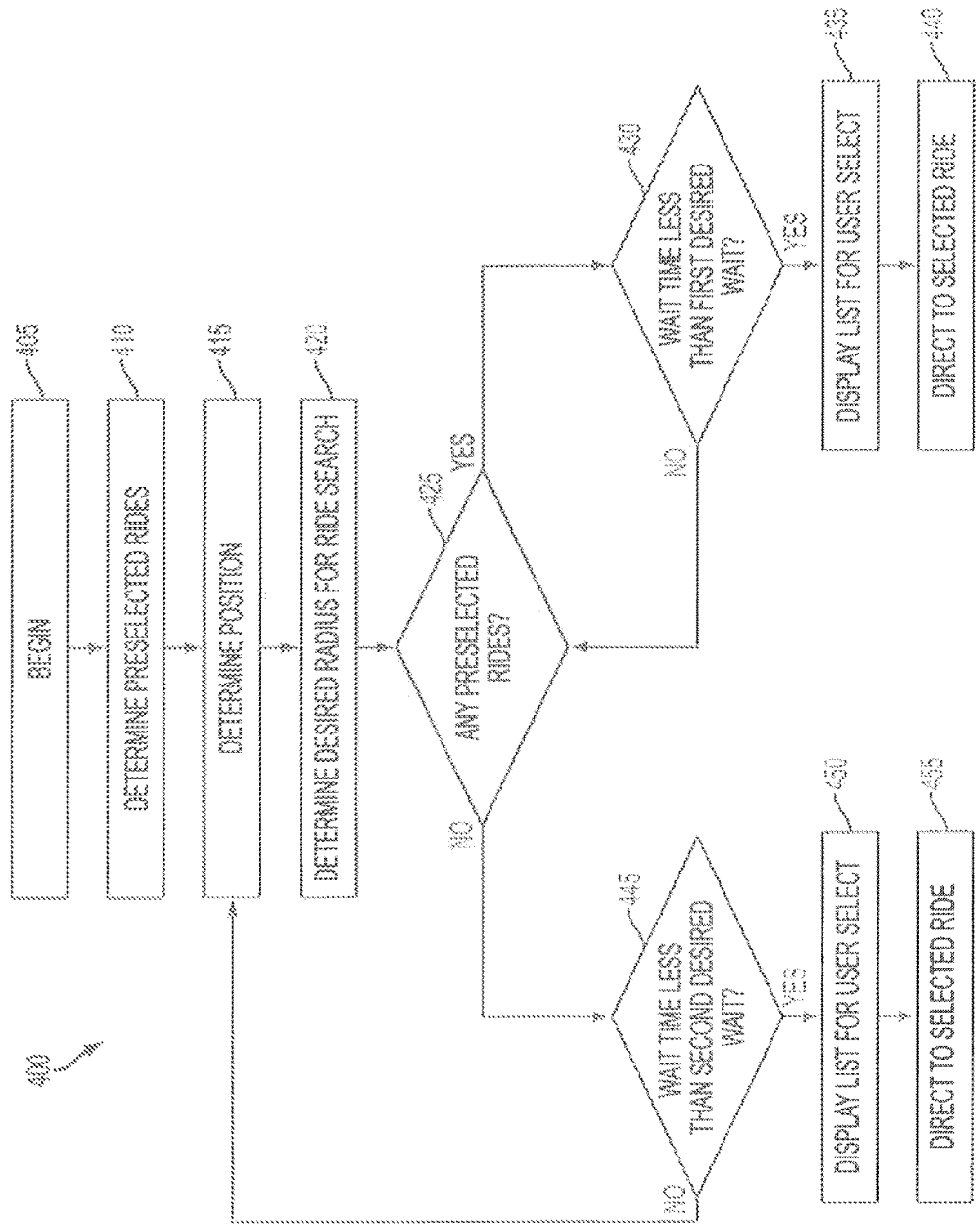
FIG. 4 shows a flowchart of operation of a mobile application corresponding to an amusement park or waterpark for directing a user to a ride based upon geographic location and wait time according to an embodiment of the present invention.

Turning next to FIG. 4, a flowchart of operation of a mobile application 400 for execution on an electronic device and corresponding to an amusement park or waterpark is shown for directing a user to a ride based upon geographic location and wait time. The mobile application 400 may include the same or similar features as previously described. At step 405, operation begins. This may occur, for example, upon a user executing the mobile application 400 upon an electronic device. In another embodiment, operation may begin when a user has already loaded the mobile application 400, but subsequently places the mobile application 400 into a particular mode of operation (e.g., a ride navigation mode), such as by selecting a menu option or other setting within the mobile application 400. In still another embodiment, operation may begin when a user has already loaded the mobile application 400, but brings the mobile application 400 into focus or to the front of the display screen of the electronic device.

At step 410, the mobile application 400 determines or sets one or more preselected rides for the user. In one embodiment, this may occur via user interaction (e.g., the user may choose among a list of rides or attractions that are most desirable). In another embodiment, the mobile application 400 may automatically identify the one or more preselected rides for the user. For example, the mobile application 400 may interface with a user profile corresponding to the user that is stored in a memory of the electronic device or stored remotely and accessed by the mobile application 400. The user profile may contain information identifying the types of rides most enjoyed by the user, characteristics of the user (height, age, weight, etc.), previously stored rides or attractions participated on by the user, previously stored rides indicated by the user as desirable, etc. Using the information in the user profile, the mobile application 400 may automatically choose a predetermined set of rides for the user. The selection may be based upon any of a variety of information in addition to or alternate from user profile information, such as time expected to be spent in the park, time of day visiting the park, expected weather during the visit to the park, whether the user is visiting the park during a particular time of year (e.g., holiday or peak period), etc.

At step 415, the mobile application 400 determines a position of the electronic device being used by the user. This may be performed by determining geographic coordinates for the user based off of GPS elements contained within or interfacing with the electronic device. If the electronic device is a cellular-enabled smartphone or tablet, such geographic coordinates may be determined by interfacing with one or more satellites to determine a precise position of the electronic device. Such a determination may be performed continuously or with any time delays as desired, for example, as previously discussed.

At step 420, the mobile application 400 determines and/or identifies rides or attractions within a desired radius surrounding or area in a proximity to the position of the electronic device determined in step 415. In one embodiment, the radius or proximity may be set or modified by the user. At step 425, the mobile application 400 determines whether any of the preselected rides or attractions as identified in step 410 are within the desired radius or proximity. If so, operation continues to step 430. At step 430, the mobile application 400 determines whether a wait or queue time for one or more attraction or ride is lower than a first wait time.

The first wait time may be a default time established by the mobile application 400 and/or may be a customizable time established by the user. In certain embodiments, the first wait time may be dynamic, such that it changes depending upon time of day, day of week, whether it is a holiday, the type of ride or attraction it corresponds to, etc. If the wait or queue time for one or more attraction or ride is not less than the first wait time, operation returns to step 425. However, if the wait or queue time for one or more attraction or ride is less than the first wait time, these corresponding attractions or rides are displayed to the user at step 435, for example with their associated queue or wait time. The user may then review the attractions or rides being displayed and select one or more of interest. Operation then continues to step 440 where the mobile application 400 directs or navigates the user from the position determined in step 415 to the attractions or rides selected in step 435.

If none of the preselected rides (see step 410) are within the desired radius or proximity (see step 425), operation instead continues to step 445. Similar to step 430, at step 445, the mobile application 400 determines whether a wait or queue time for one or more attraction or ride is lower than a second wait time. The second wait time may be a default time established by the mobile application 400 and/or may be a customizable time established by the user. In one example, the second wait time of step 445 may be less than the first wait time of step 430. This is because a user may be willing to wait for a longer period of time to queue for one of the desired preselected rides than for a ride that is not as desired. In certain embodiments, the second wait time may be dynamic, such that it changes depending upon time of day, day of week, whether it is a holiday, the type of ride or attraction it corresponds to, etc. In an alternative embodiment, the wait or queue time for one or more attraction or ride may be any of a variety of parameters corresponding to a ride (e.g., level of thrill of the ride, size of user, distance, age/height/weight requirements, etc.)

If the wait or queue time for one or more attraction or ride is not less than the second wait time, operation returns to step 415 and operation continues as previously discussed. However, if the wait or queue time for one or more attraction or ride is less than the second wait time, these corresponding attractions or rides are displayed to the user at step 450, for example with their associated queue or wait time. The user may then review the attractions or rides being displayed and select one or more of interest. Operation then continues to step 455 where the mobile application 400 directs or navigates the user from the position determined in step 415 to the attractions or rides selected in step 450.

Figure 5:
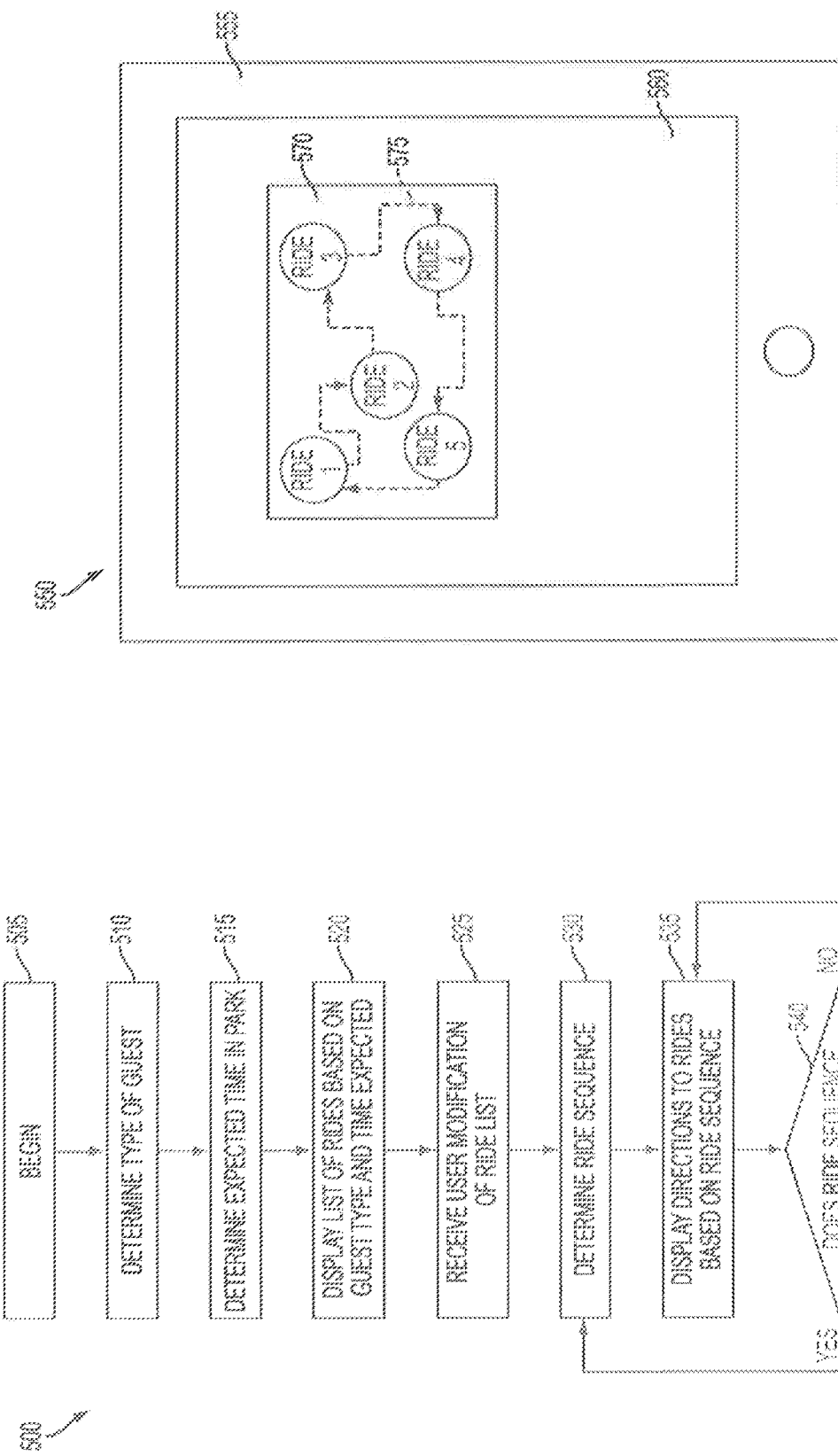
FIG. 5A shows a flowchart of operation of a mobile application corresponding to an amusement park or waterpark for determining a sequence of rides for a user based upon user characteristics according to an embodiment of the present invention.
FIG. 5B shows a display screen of a mobile application corresponding to an amusement park or waterpark for directing a user to a sequence of rides based upon user characteristics according to an embodiment of the present invention.

FIG. 5A shows a flowchart of operation of a mobile application 500 corresponding to an amusement park or waterpark for determining a sequence of rides for a user based upon user characteristics. The mobile application 500 may include the same or similar features as previously described. At step 505, operation begins. This may occur, for example, upon a user executing the mobile application 500 upon an electronic device. In another embodiment, operation may begin when a user has already loaded the mobile application 500, but subsequently places the mobile application 500 into a particular mode of operation (e.g., an attraction selection mode), such as by selecting a menu option or other setting within the mobile application 500. In still another embodiment, operation may begin when a user has already loaded the mobile application 500, but brings the mobile application 500 into focus or to the front of the display screen of the electronic device.

At step 510, the mobile application 500 determines a type of guest representative of the user. This may be accomplished by querying the user to answer one or more questions, for example, the user's age, height, gender, favorite types of ride, etc. In another embodiment, a plurality of guest types may be defined and shown to the user for user self-identification and selection. In still another embodiment, a default type of user may be established by the mobile application 500. If the mobile application 500 stores or otherwise interfaces with a user profile, such information or guest type data may be automatically retrieved by the mobile application 500 upon association of the user profile with the user.

After determining the type of guest corresponding to the user, operation continues to step 515 where the mobile application 500 determines the amount of time expected or estimated that the user will be available to participate in the various attractions or rides within the park. Similar to the determination of guest type as discussed above, this may be accomplished by querying the user to answer one or more questions (e.g., expected time to enter the park, expected time to exit the park, how many meals are expected to be eaten at the park, etc.) In another embodiment, a plurality of time amounts may be defined and shown to the user for user self-identification and selection. In still another embodiment, a default amount of time for user activity in the park may be established by the mobile application. Similarly, such information may be stored and retrieved as part of a user profile, as discussed above.

At step 520, the mobile application 500 determines and displays a list of attractions or rides for the user based upon the determination of type of guest in step 510 and based upon determination of the amount of time expected that the user will be in the park in step 515. The mobile application 500 may store or have access to information about the park, including a listing of the available rides and their common wait or queue times that is used in conjunction with the guest information described above and in order to determine the list of attractions or rides. For example, if the user is determined to be a guest most interested in thrill rides and expects to spend 8 hours in the park participating on various attractions, the mobile application 500 may focus selection upon only exciting rides for older individuals such as roller coasters, high-speed water rides, and the like. Since these thrill rides may have longer wait times associated with them than other, tamer rides, fewer attractions or rides may be determined and displayed for the user than if the user was determined to be a type of guest that did not enjoy thrill rides.

At step 525, the user is allowed to modify the attraction or ride list determined by the mobile application 500 in step 520. Thus, the user is permitted to add or remove particular rides to better conform to the desired amount and type of rides when at the park. Operation next continues to step 530 where the mobile application 500 determines a response option (e.g., a ride sequence, a query to the user for a next ride to visit, etc.) for the modified ride list of step 525. For example, the mobile application 500 may have information stored in a memory of the electronic device or may interact with a remote server storing such information that relates to wait or queue times for the various rides of the modified ride list. The wait or queue time information may include separate wait times for each ride based upon time of day, day of week, holidays vs. standard calendar days, etc. Thus, if a particular ride commonly has a long queue time, but is typically less busy at a particular time of day (e.g., immediately upon park opening), that ride may be scheduled first for user participation in an effort to most efficiently manage time of the user while they are in the park. In another embodiment, the wait times for each ride may be instantaneously obtained via interfacing with a system that monitors and updates in real time with line queue data.

At step 535, the mobile application 500 navigates the user around the amusement park based upon the response option (e.g., the attraction sequence) for the modified list of attractions. For example, this may be done by displaying textual navigation instructions (e.g., "turn right here," "head west," "travel straight ahead for 50 meters," etc.). In another example, a map may be displayed to the user with a graphical indication showing a travel path for the user (e.g., a dotted line leading from the determined position of the electronic device to the subsequent attraction to be visited by the user). Certain embodiments may feature both a map and textual directions.

At step 540, the mobile application 500 determines whether the response option (e.g., attraction sequence) needs to be modified. This may be determined automatically without user intervention, for example by interfacing with a park system that transmits data about the attractions. For example, if a particular attraction breaks down or has a line queue time above a certain threshold, the attraction sequence may be modified to remove or otherwise delay the attraction in the list of rides to visit. In another example, a user may indicate that the attraction sequence needs to be modified by interfacing with the mobile application 500. If the attraction sequence does not need to be modified, operation continues at step 535 until each of the rides determined in the response options, such as the modified ride list, are visited by the user. If the attraction sequence does need to be modified, operation continues to step 530 for such modification, as previously discussed.

FIG. 5B shows a display screen of a mobile application 550 corresponding to an amusement park or waterpark for directing a user to a sequence of rides based upon user characteristics. The mobile application 550 may include the same or similar features as previously described. An electronic device 555 includes a display or other screen 560 configured to display graphical information of the mobile application 550. A map 570 is shown on the display screen and includes a travel path or indication 575 for navigating the user through the sequence of rides during their visit within the amusement park or waterpark, the same or similar as previously discussed for FIG. 5A.

Figure 6:
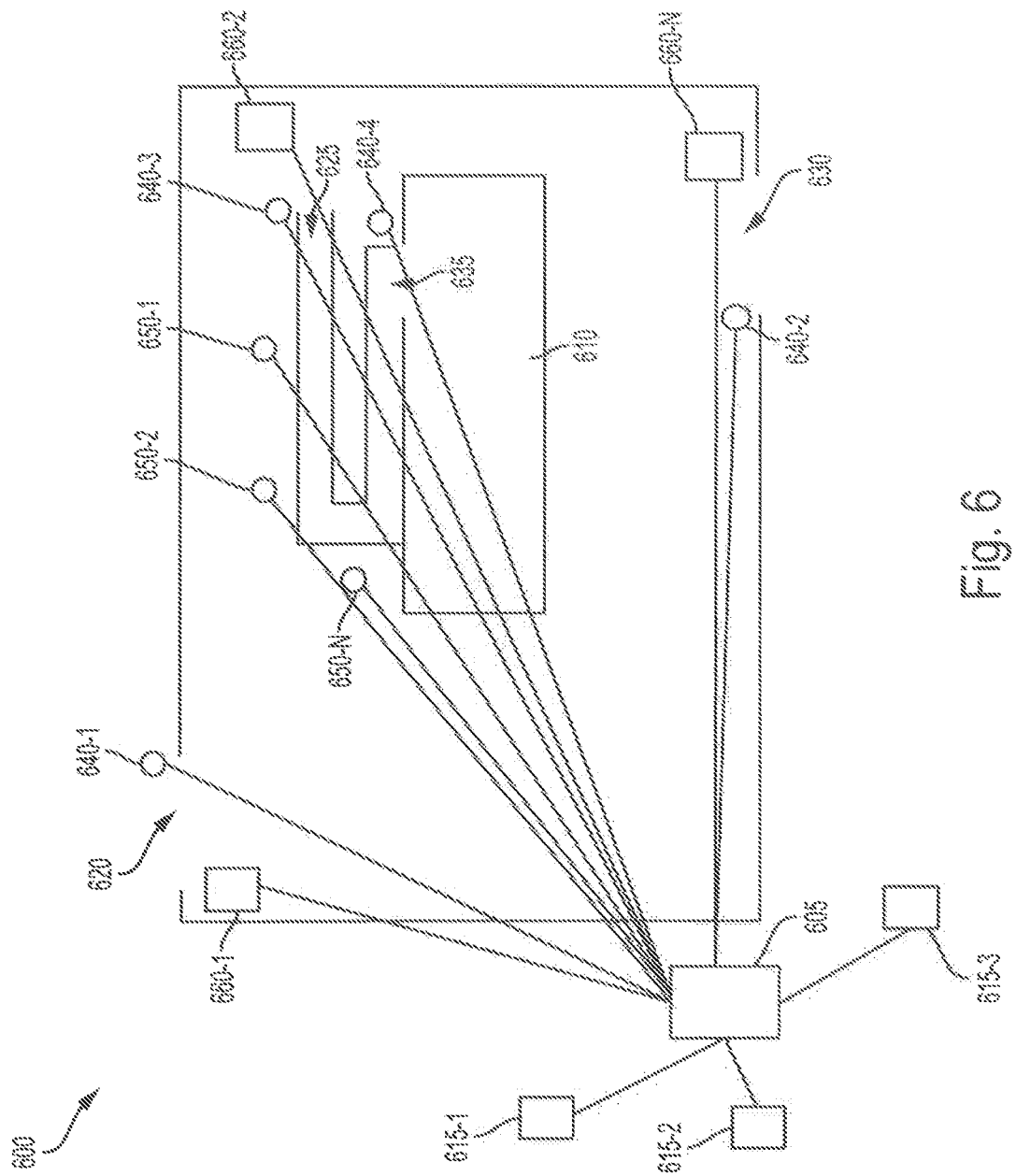
FIG. 6 shows a block diagram of a first exemplary system proximate to an entertainment attraction in the form of a water slide according to an embodiment of the present invention.

FIG. 6 illustrates a first exemplary system 600 installed proximate to a water slide attraction 610. Although a water slide attraction 610 is shown and described for FIG. 6, any of a variety of other attractions (e.g., non-water based, dry attractions, such as roller coasters, etc.) may be used in an alternative embodiment. Moreover, non-thrill or ride attractions may be used in still other embodiments, such as restaurants, vendors, kiosks, etc. The system 600 may include one or more of the same or similar features as previously described. The water slide attraction 610 includes an entrance 620 and exit 630 which generally control guest flow into and out of the water slide attraction 610. One feature of the system 600 relates to tracking the location and/or action(s) of one or more of the guests that participate or interact with the water slide attraction 610. The tracking feature may be limited to the water slide attraction 610 and/or may be more widely distributed throughout the water park, as discussed in greater detail throughout.

The tracking feature of the system 600 may comprise one or more technologies, including biometric data acquisition, radio frequency identification ("RFD") hardware and/or software, short or long range radio frequency hardware and/or software, bar codes and/or readers, photo cells, GPS, near field communication(s) and numerous others. For example, in one embodiment, one or more guests are provided with short or long range radio frequency or RFD-enabled wristbands (or other apparatus, such as ankle-band, necklace, card, keyfob, etc.) configured for identification by readers/sensors (640-1, 640-2) that may be positioned near the entrance 620 and/or the exit 630 of the water slide attraction 610, respectively. It is recognized that more than two readers/sensors (640-1, 640-2) may be installed near the entrance 620 and/or exit 630 of the water slide attraction 610 in alternative embodiments. Moreover, fewer than two readers/sensors (640-1, 640-2) may be installed in other embodiments, at either, both, or in different locations than the entrance 620 and/or exit 630. Although the readers/sensors 640-1 through 640-4 are shown at specific locations, any desired locations may utilize a reader/sensor in alternative embodiments.

Another pair of sensors (640-3, 640-4) may be positioned near a queue line entrance 625 and/or a queue line exit 635. In another embodiment, readers and/or medium-to-long range sensor(s) may be installed throughout the waterpark or amusement park (or other location) to track guests more extensively. In one embodiment, guests may provide personal information in order to receive RFID-enabled wristbands or other apparatus such that each guest may be tracked by the system 600 and a specific record created for each guest by name or other unique identifier. Alternatively, the RFID-enabled wristbands or other apparatus may be tracked without reference to the personal information of guests.

As guests enter and exit the water slide attraction 610, the reader/sensors (640-1, 640-2) identify the RFID-enabled wristbands or other apparatus (e.g., using conventional RFID technology) and may transmit times of entry and/or exit to a storage device, such as a central server 605, for recordation in memory (e.g., a database). Similarly, as guests enter and exit the queue line, the reader/sensors (640-3, 640-4) identify the RFID-enabled wristbands or other apparatus (e.g., using conventional RFID technology) and transmit times of entry and exit to the central server 605 for recordation in memory (e.g., a database). The central server 605 may be on-site or remote whereby a cloud database may retain the data. In certain embodiments, the central server may comprise a plurality of servers in communication with one another. From the entrance and exit times, the system 600 may be configured to calculate dispatch rates related to entering the water slide attraction 610 and/or exiting the water slide attraction 610. The dispatch rates (e.g., real-time dispatch rates) may be compared to expected or predicted dispatch rates to determine, among other things, how efficiently the water slide attraction 610 is operating and/or how effectively water park staff manages the water slide attraction 610. The system 600 may also be configured to calculate queue line wait times. Such queue line wait times may be analyzed to improve the water slide attraction 610 operation and water park staff efficiencies.

In one embodiment, one or more cameras 650-1 through 650-N may capture images or representations of guests entering and exiting the water slide attraction 110 and queue line. Although the one or more cameras 650-1 through 650-N are shown at specific locations, any desired locations (e.g., at the entrance 620 and/or the exit 630) may utilize a camera in alternative embodiments. Such cameras 650-1 through 650-N may be used in addition to or in replacement of one or more of the reader/sensors (640-1, 640-2, 640-3, 640-4). The images from the one or more cameras 650-1 through 650-N may be evaluated manually or automatically (e.g., by computer software/programs configured to count and monitor the movement of the images or representations of the guests) to generate the dispatch rates and/or queue line wait times. In another embodiment, additional sensors, for example instead of cameras, may be located at a particular or predetermined distance from expected positions of guests. The cameras and/or additional sensors may be configured to detect (e.g., via image recognition, sensing of RFID, etc.) as they pass by without any visible guest action.

Another aspect of the system 600 relates to collecting of feedback from one or more guests as they experience the water slide attraction 610. The guest feedback may be collected before (e.g., in the queue line), during (e.g., while actually traversing the water slide attraction 610), and/or after (e.g., near an exit area) the guest experiences the water slide attraction 610. In one embodiment, one or more guest interfaces 660-1 through 660-N are positioned proximate to the water slide attraction 610 (e.g., between the entrance 620 and the exit 630) depending on the feedback to be collected. The one or more guest interfaces 660-1 through 660-N may be computer terminals, smart devices, touch screen displays, kiosks, control panels having buttons or other user interface elements, game interface consoles, etc. In an alternative embodiment, the guest interfaces 660-1 through 660-N may be in the form of mobile devices assigned to guests by the water park upon arrival to the water park. In another alternative embodiment, guests may download an application on their own smart device (e.g., the guests personally owned cell phone) thereby rendering the smart device a guest interface capable of communicating data to the central server 105. In still another alternative embodiment, guests may communicate their satisfaction in front of a camera equipped with biometric software that captures and interprets their happiness based on their facial appearance and/or other indicia (e.g., gestures, volume of speech, etc.).

Like the readers/sensors 640-1 through 640-4, the one or more guest user interfaces 660-1 through 660-N may communicate wirelessly or via a wired connection with the central server 605 or other central-type storage device. In one embodiment, a separate storage device may be utilized for each attraction employing such tracking and/or feedback capabilities. The various separate storage device(s) for each configured attraction may then be configured to communicate with a more centralized server or computer system. Computer software/programs running on the central server 605 may handle storage of guest tracking data, collected guest feedback, and/or other guest information acquired by the system 600. The guest tracking data, collected guest feedback, and/or other guest information may be stored in database form and accessed by water park designers and operators or other users via one or more computer terminals 615-1 through 615-N (e.g., a laptop computer, a client computer configured for interaction with a server or smart phone or tablet) able to access the central server 605.

In one embodiment, the one or more guest interfaces 660-1 through 660-N are configured to collect or determine a guest satisfaction level. For example, one or more of the guest interfaces 660-1 through 660-N positioned near the exit 630 of the water slide attraction 610 may prompt guests to select a satisfaction level associated with the water slide attraction 610 wherein the satisfaction level is selected from the group comprising "Happy=☺," "So-So=☻" and "Sad=☹," for as example as discussed in greater detail in FIG. 9.

In conjunction, or alternative to guests manually inputting a satisfaction level, one or more cameras or other sensors (e.g., cameras and/or sensors previously discussed and/or different cameras and/or sensors) may capture facial images of the guests which are analyzed by appropriate computer software/programs to determine the mood of the guests. For example, a frown suggests a sad guest while a smile suggests a happy guest. Other manners of detecting and/or determining mood of guests may be used in alternative embodiments (e.g., analyzing gestures, voice recognition, volume recognition of guest speech, etc.). With the identification of each guest via the RFID-enabled wristbands (or other tracking system), each guest's satisfaction level, as determined by direct feedback (e.g., using one or more of the guest interfaces 660-1 through 660-N) and passive feedback (e.g., cameras), may be recorded at the central server 605 and made available to designers and operators in real time or other users, at the same or similar time to their capture and/or at a later time.

In certain embodiments, guests may be allowed to interact with one or more of the guest interfaces 660-1 through 660-N and/or other kiosks, stations, or mobile devices for the purposes of engaging in gaming and/or entertainment activities while waiting in a queue line of the water slide attraction 610. In such embodiments, if the water slide attraction 610 (or other amusement attraction) already integrates interactive gaming as part of its functionality (e.g., water slides or other attractions where a rider or user must interact with one or more elements of the attraction), the additional gaming and/or entertainment activities while in the queue line may be linked to the system 600 such that data (e.g., real-time data) associated with the gaming and/or entertainment activities and/or the interaction features of the attraction itself may each or all be collected to further assist in developing a satisfaction model for guests.

In one embodiment, the system 600 may be configured to offer purchasing options to guests via the one or more guest interfaces 660-1 through 660-N. Via the one or more guest interfaces 660-1 through 660-N, guests may be provided with options to purchase photographs and/or videos of the guest on the water slide attraction 610, customized souvenirs, and/or any of a variety of other items sold throughout the water park. Using the RFD-enabled wristband (e.g., or other identification possibilities), a guest may purchase the item, receive a receipt and/or schedule for or pick up the item before leaving the water park. In another embodiment, photographs and video may be emailed or made available for future downloading by the guest. Those skilled in the art will recognize that other technologies, such as a bar code band, tap card or biometric input may be used to identify the guest and facilitate the purchase. Like other guest feedback, the actions of guests responsive to purchasing options are collected by the system 600 and made available to designers and operators in real time.

In a manner similar to the purchasing options, the system 600 may also or alternatively be configured to offer food and beverage options to guests via the guest user interfaces 660-1 through 660-N. In one embodiment, the food and beverage options may be offered in the form of rewards (e.g., discounts, coupons, etc.) for interacting with the water slide attraction 610 and/or corresponding to a theme of the water slide attraction 610. In other embodiments, any form of reward (e.g., related to food, beverage, product, or otherwise) may be offered to a guest based upon any data collected and/or sensed by one or more components of the system 600. For example, if a guest is tracked and/or provides feedback on a ride with a nautical theme, a reward such as a discount, coupon, advertisement, etc. may be offered to the guest to a restaurant or vendor associated with nautical themes, such as a seafood restaurant. Offerings may include discounts, time-expiring promotions or souvenir experiences based on the water slide attraction 610 or experiences integrated with the water slide attraction 610. The reward may be a communication presented to the guest via one or more of the guest user interfaces 660-1 through 660-N (e.g., via a viewable or printable coupon and/or code or other form of coupon display that a user may reference when completing or otherwise claiming the reward) and/or may additionally or alternatively may be presented or transmitted to the user via a variety of other manners, such as an Email message, an SMS message, an MMS message, etc. Other examples of reward communication to a guest may be via a mobile application (e.g., a software application that is executed on the guest's personal mobile device, such as a smart phone) that is in communication with the system 600, at the actual point-of-sale (e.g., a particular vendor or restaurant may be linked with the system 600 such that the particular vendor or restaurant may already have a record of the guest's available discounts or rewards without requiring any further effort on behalf of the guest to claim the reward), etc.

In another example, for a Pineapple Express-themed water slide, guests are offered a promotion on pineapple smoothies after experiencing the Pineapple Express water slide. In still another example, a guest receives VIP access (e.g., priority or front-of-the-line access) to a particular vendor and/or ride in response to the guest achieving a high score and/or other achievement on an attraction that utilizes rider interaction while participating on the attraction (e.g., a waterslide where a user interacts, such as via button-presses, with other elements of the slide while traversing down the slide). In still another example, a family may receive a complimentary and/or discounted meal responsive to the family and/or an individual in the family achieving a high score and/or other achievement on a video gaming experience while in the queue line. Like other guest feedback, the actions of guest(s) responsive to the vendor, food and/or beverage options may be collected by the system 600 and made available to designers, operators, and/or other users (e.g., in real time).

The system 600 may also or alternatively offer guests social media options before, during, and/or after experiencing the water slide attraction 610. The social media options may include allowing guests to post text messages, photographs, and/or videos of the experience and/or transmit other communications or posts regarding the experience. The social media options may be presented via the guest user interfaces 660-1 through 660-N (e.g., for an additional fee or for free) or via a software application linked to the system 600. In certain embodiments, other forms of consideration, other than direct monetary compensation, may provide the access to one or more social media options (e.g., posting a "like" corresponding to the water park and/or water slide attraction). Like other guest feedback, the actions of guests responsive to the social media options may be collected by the system 600 and made available to designers, operators, and/or other users (e.g., in real time).

The system 600 may also or alternatively be configured to permit guests to communicate with other guests, for example via the guest user interfaces 660-1 through 660-N. For example, guests may post a photograph on a social media network and/or transmit a link to such post to a specific guest within the water park. In another example, a guests may be able to directly communicate with other guests, such as via guest user interfaces 660-1 through 660-N. Such direct communication may be a chat interface with back-and-forth communication and/or a "pager" type interface where only a single message is communicated, but a prior "history" of messages sent is not saved or maintained.

In one example, a first guest may invite one or more other guests to meet him or her at a time and place within the water park and/or such an invite may be confirmed by the recipient to indicate the invite was received, the invite was read, and/or the invite was responded to. In one embodiment, only particular guests may be chosen for communication (e.g., a family may only be permitted to send messages to other family members or friends authorized for communication), while in other embodiments, all or some other portion of guests outside authorized friends and/or family may be capable of receiving and/or sending messages to other of the all or some other portion of guests. Like other guest feedback, the actions of guests responsive to the communication options may be collected by the system 600 and made available to designers, operators, and/or other users (e.g., in real time).

The system 600 may also aid in providing location information about other guests. For example, in one embodiment, the system 600 may be setup to allow certain guests access to other particular guest locations (e.g., family members, friends, etc.). Such authorization may be setup manually by the guests upon entering the park, or may be more globally determined via data fields of a particular guest's user account that has previously stored those other users who are authorized to view their location. In this fashion, such guest location information may be made available (e.g., directly or via first having to interface with an operator for the amusement park for privacy purposes) to another guest who requests information on such location (e.g., at one of the guest user interfaces 660-1 through 660-N, within a software application being executed on a mobile device of the guest, etc.).

Usage of user accounts with data that is stored for particular users across visits to the venue or park may provide additional personalization or customization (e.g., automatically without requiring additional guest interaction) of various attractions or venues. For example, if a guest has stored as part of their account or profile that they enjoy rock music, attractions or venues that are connected with the system 600 may be configured to automatically update their music, lighting, theme, etc. according to the guest data that is stored.

In another embodiment, the system 600 may collect guest feedback at non-attraction locations (e.g., vendors, restaurants, etc.) within the water park. For example, the system 600 may record purchases (e.g., souvenirs) or other activities at non-attraction locations, but related to an attraction which the guest previously experienced (e.g., purchase of an item, wristband or other sensed item (e.g., RFID), ride vehicle, or other product at a vendor and/or digitally that are associated with a particular ride). Such purchases may be digital in nature (e.g., titles, badges, avatars, avatar customizers such as clothing and/or accessories, access to digital content, such as in-app purchases, etc.). Any and/or all such purchases may be tracked by the system 600. Like other guest feedback, such feedback may be collected by the system 600 and made available to designers, operators, and/or other users (e.g., in real time).

The system 600 may also or alternatively collect data relative to water park staff. For example, the system 600 may collect data related to water park staff working the water slide attraction 110 such that the water park staff may be evaluated against desired criteria related to the operation of the water slide attraction 110. In one specific instance, the dispatch rates and queue line wait times may be analyzed against the subject water park staff since such criteria may correspond, at least in part, to the competency of the water park staff operating the water slide attraction 110. Other data related to the water park staff may be collected and evaluated as well or alternatively (e.g., locations of staff throughout park, amount of sales of staff, etc.).

Figure 7:
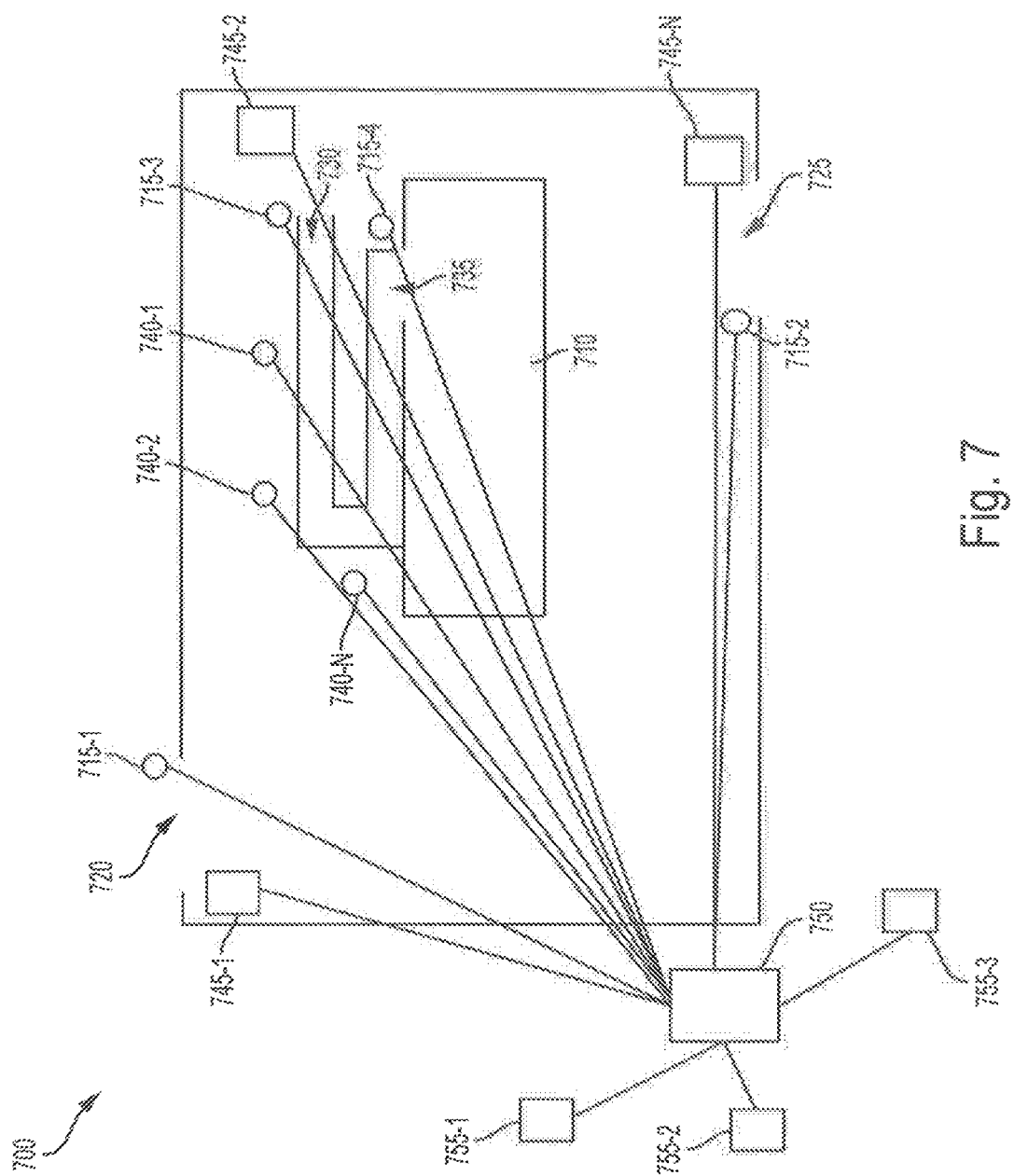
FIG. 7 shows a block diagram of a second exemplary system proximate to an entertainment attraction in the form of a water slide according to an embodiment of the present invention.

FIG. 7 shows a system 700 installed proximate to a water slide attraction 210. Certain features of the system 700 may be the same as or similar to those previously discussed. For example, the system 700 may operate in a similar manner to the system 600 of FIG. 6, except that the RFD-enabled wristbands and readers/sensors 640-1 through 640-4 of FIG. 6 may be replaced and/or supplemented with biometric readers 715-1 through 715-4 that are configured to track guests based on biometric data (e.g., fingerprints, iris scans, facial recognition, etc.). Biometric readers 715-1 through 715-4 may be positioned proximate to an entrance 720 and/or an exit 725 of the water slide attraction 710 and/or queue line entrance 730 and exit 735 may be configured to track and identify guests. The biometric readers 715-1 through 715-4 may collect biometric data passively or via guest action. Entrance and exit times for either the ride attraction 710 as a whole and/or the queue line of the ride attraction 710 may be transmitted to a central server 750 and/or used to generate dispatch rates and/or queue line wait times, for example, the same as or similar to the description above relating to system 600 of FIG. 6. Images captured by cameras 740-1 through 740-N may be used in conjunction and/or in replacement of the biometric readers 715-1 through 715-N to generate or determine dispatch times and/or queue line wait times. Guest interfaces 245-1 through 245-N may be configured to collect guest feedback for use by the system 700. The central server 750 may stores various data and collected feedback in database form and render it accessible via computer terminals 255-1 through 255-N by water park designers, operators, and/or other users.

Figure 8:
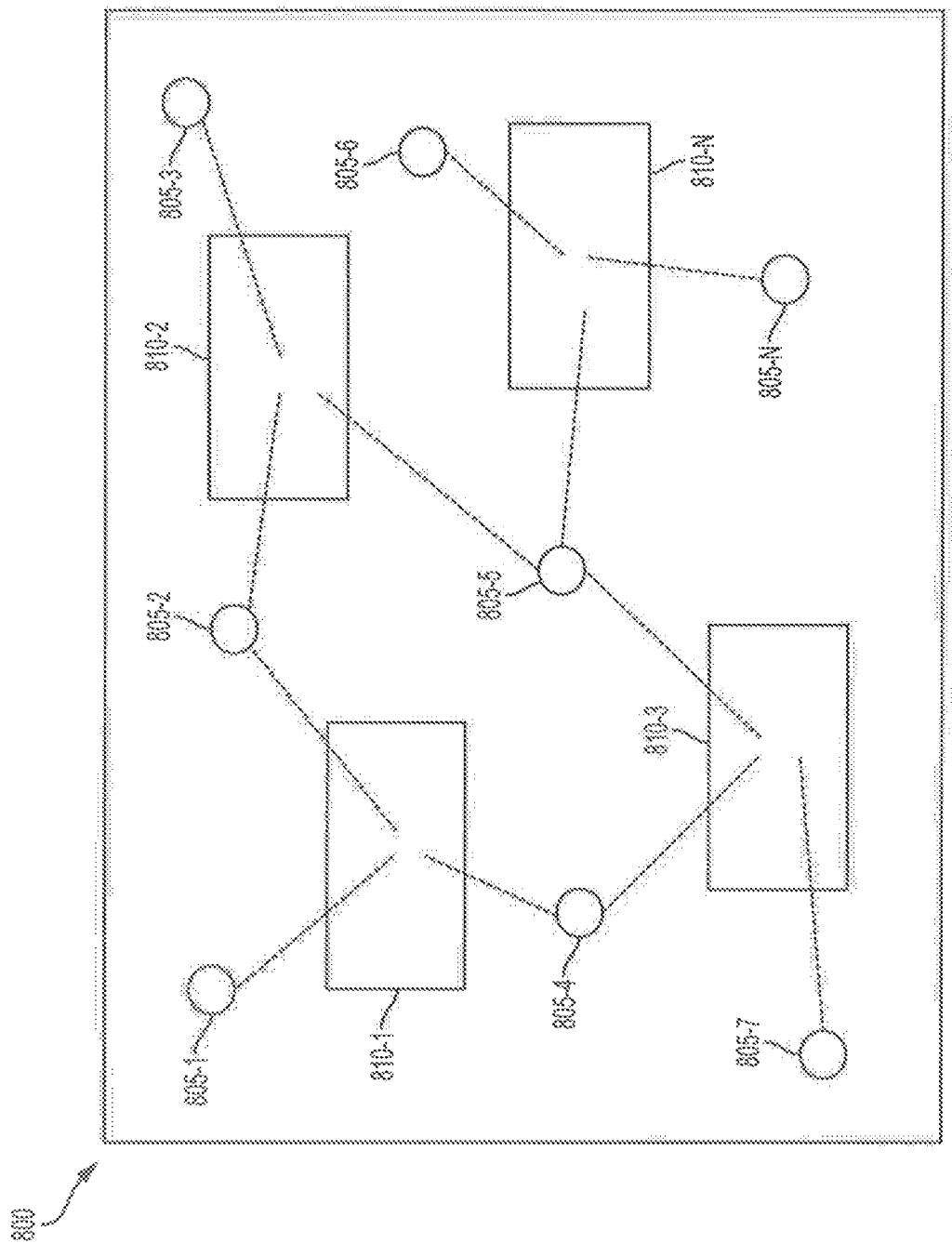
FIG. 8 shows a block diagram of a third exemplary system according to the embodiments of the present invention.

As shown in FIG. 8, a system 800 may include a plurality of sensors 805-1 through 805-N (e.g., long-range RF, etc.) positioned throughout a water park or amusement park or other facility and configured to detect items worn and/or carried by guests (e.g., RF wristbands) from long distances to facilitate ease of use. Accordingly, the system 800 may allow for tracking and/or collecting of guest data without requiring finer positioning and/or locating of a reader worn or carried by a guest in close proximity to a shorter-range sensor/reader. The sensors/readers 805-1 through 805-N may detect guests as they enter and exit various attractions 810-1 through 810-N and enter and exit queue wait lines to facilitate same or similar functionality as previously discussed.

Figure 9:
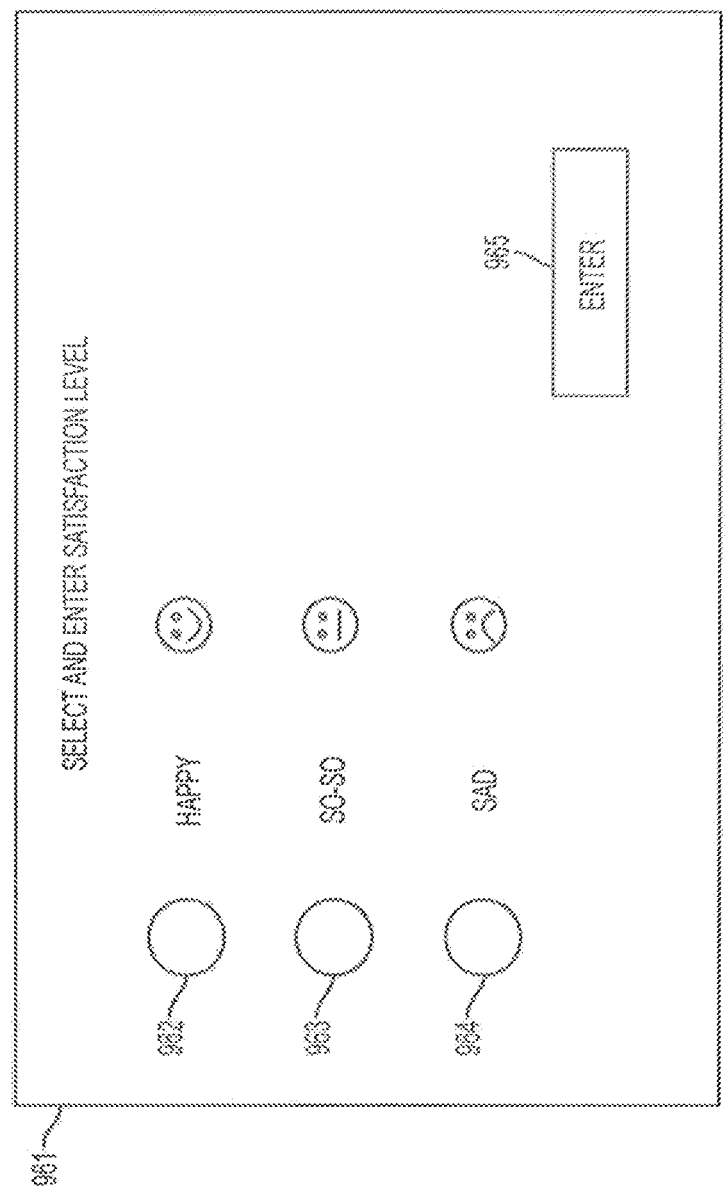
FIG. 9 shows a screen shot of a guest interface according to an embodiment of the present invention.

Turning to FIG. 9 and as previously introduced above for FIG. 6, a guest may be prompted for their satisfaction with a particular ride, vendor, experience, or for the water or amusement park as a whole via a guest interface (e.g., a guest interface 660-1 through 660-N as previously discussed for FIG. 6. One such embodiment of a screen for prompting guest satisfaction selection may be illustrated by FIG. 9. FIG. 9 shows a screen shot 961 of a guest interface presenting a guest with satisfaction level icons 962-964, corresponding to the above-described satisfaction levels. In an alternative embodiment, additional, fewer, and/or different satisfaction levels may be used. A guest is able to select one of the satisfaction level icons 962-964 and enter the same using an enter icon 965. Upon pressing the enter icon 965, the selected satisfaction level may then be sent and/or saved in memory (e.g., within a server, such as central server 605 described in FIG. 6). In an alternative embodiment, no enter icon 965 may be desired, the satisfaction level being sent and/or stored immediately upon a guest pressing a corresponding satisfaction level icon.

Figure 10:
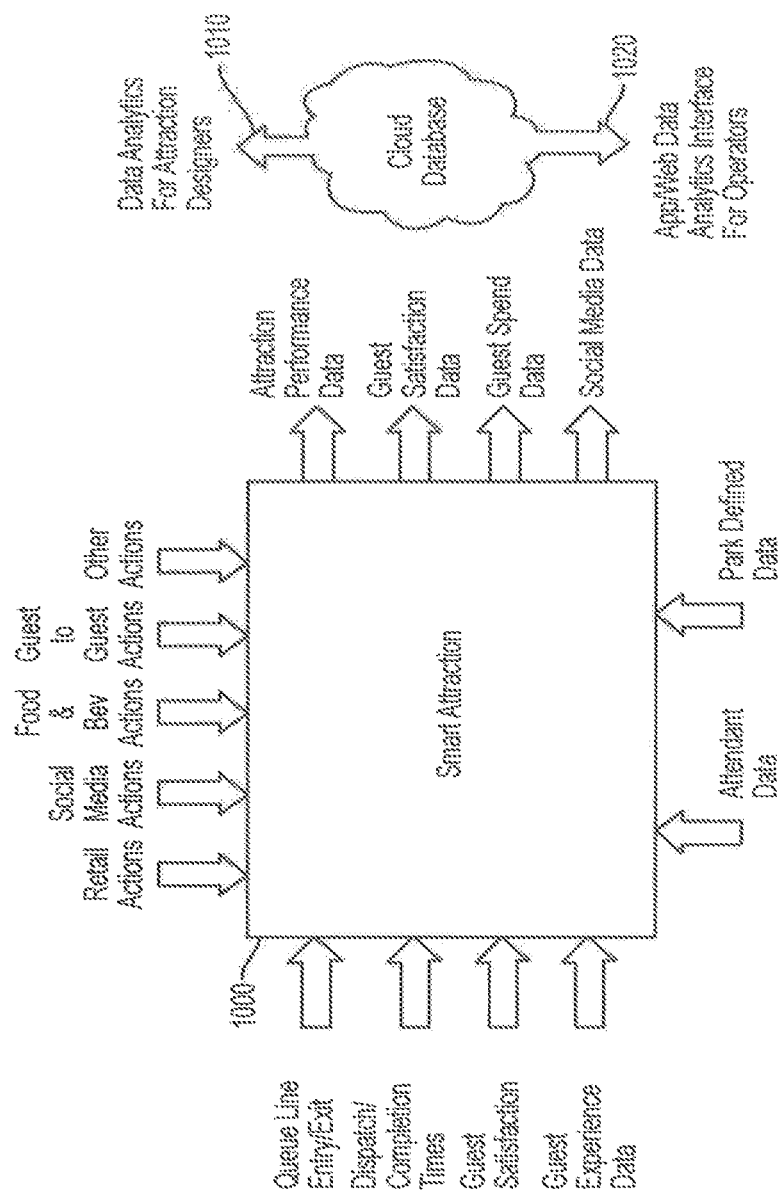
FIG. 10 shows a block diagram of exemplary inputs and outputs of a system according to an embodiment of the present invention.

FIG. 10 illustrates a variety of data inputs and outputs for a system 1000 corresponding to tracking and/or data collection (e.g., systems 600, 700 and/or 800). The system 1000 may be used in conjunction with a software application (e.g., a web application, downloadable app, etc.). For example, such software application may be executed and/or accessible by a mobile device, such as a smart phone or tablet. Water or amusement park designers, operators, and/or other users may be able to view and/or manipulate various data used nu the software application, for example, in real-time. The data and feedback may be used to generate historical trends, peak performances, diagnostics and/or analytics which are also viewable by designers, operators, and/or other users remotely (e.g., in real time). Such system 1000 corresponding to tracking and/or data collection (e.g., systems 600, 700 and/or 800) may provide designers, operators, and/or other users with a variety of helpful information regarding attraction operations in real time and/or over extended time periods, such as personnel performance and guest activities, any or all of which can be evaluated against benchmarks and/or attractions operating in other comparable venues.

More specifically, FIG. 10 shows exemplary data and collected feedback, namely queue line entry and exit times, dispatch rate times, guest satisfaction, guest experience data, retail actions, social media actions, food and beverage actions, guest-to-guest actions, other actions, attendant data and park defined data, being input into the system 1000, the same or similar to previous discussions. The system 1000 then may output attraction performance data, guest satisfaction data, guest spend data and social media data. The output data, in the form of data analytics, may be accessible via a cloud database 1010 by attraction designers while operators may access analytics data 1020 via an application/web data analytics interface for example, as described above. In other embodiments, any or all of the output data and/or input data illustrated in FIG. 10 may be viewed and/or manipulated by a variety of other users with access to the system 1000.

Figure 11:
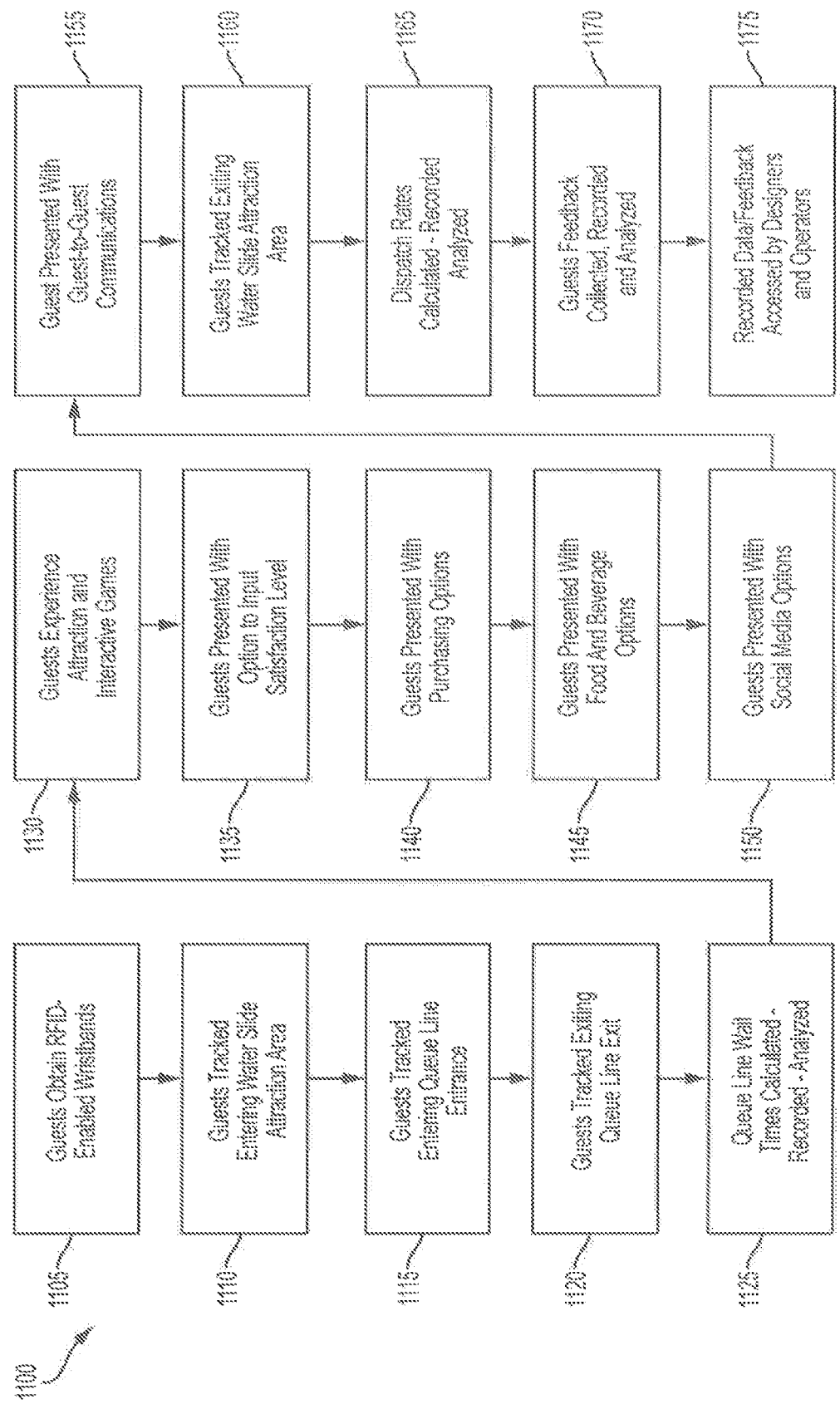
FIG. 11 shows a flow chart detailing one method for operating a system according to an embodiment of the present invention.

FIG. 11 shows a flow chart 1100 detailing one methodology facilitated by a tracking and/or feedback collecting system, such as those systems previously discussed. Although the flow chart 1100 illustrates specific steps in a specific order, alternative embodiments may utilize additional, fewer, or the same number of steps in alternative orders. Various steps may include features or details as discussed throughout. At 1105, guests obtain the RFID-enabled wristbands (or other products capable of being sensed) and provide personal information to associate with the RFID-enabled wrist band. The RFID-enabled wristbands and readers/sensors permit guests to be tracked near attractions and/or throughout an entertainment venue. At 1110, guests are tracked entering an attraction area. At 1115, guests are tracked entering a queue line for the attraction. At 1120, guests are tracked exiting the queue line for the attraction. At 1125, based on the recorded queue line enter and exit times, queue line wait times are calculated, recorded and/or analyzed. At 1130, guests experience the attraction and optional interactive games while experiencing the attraction. At 1135, guests are presented the option to enter a satisfaction level associated with the attraction. One or more guest interfaces (e.g., kiosks or terminals) facilitate entering the satisfaction level by the guests.

At 1140, guests are presented with retail purchasing options via the one or more guest interfaces. At 1145, guests are presented with food and/or beverage options via the one or more guest interfaces. At 1150, guests are presented with social media options via the one or more guest interfaces. At 1155, guests are presented with guest-to-guest communication options via the one or more guest interfaces. At 1160, guests are tracked exiting the attraction. At 1165, dispatch rates are calculated, recorded and/or analyzed. For example, a dispatch rate for a guest may be based on any or all of the data tracked at any combination of the previously mentioned steps (e.g., steps 1110, 1115, 1120, and/or 1160) and/or may be based upon multiple guest data (e.g., an average or other synthesis of multiple data points) to determine how much time or otherwise how efficient the guests were capable of traversing in and/or out of the attraction or its areas. At 1170, guest feedback is collected, recorded and/or analyzed. At 1175, recorded data and feedback may be accessed by water park designers, operators, and/or other users. With recorded data and feedback, designers, operators, and/or other users may be better suited to design and develop or operate amusement venues.

Figure 12:
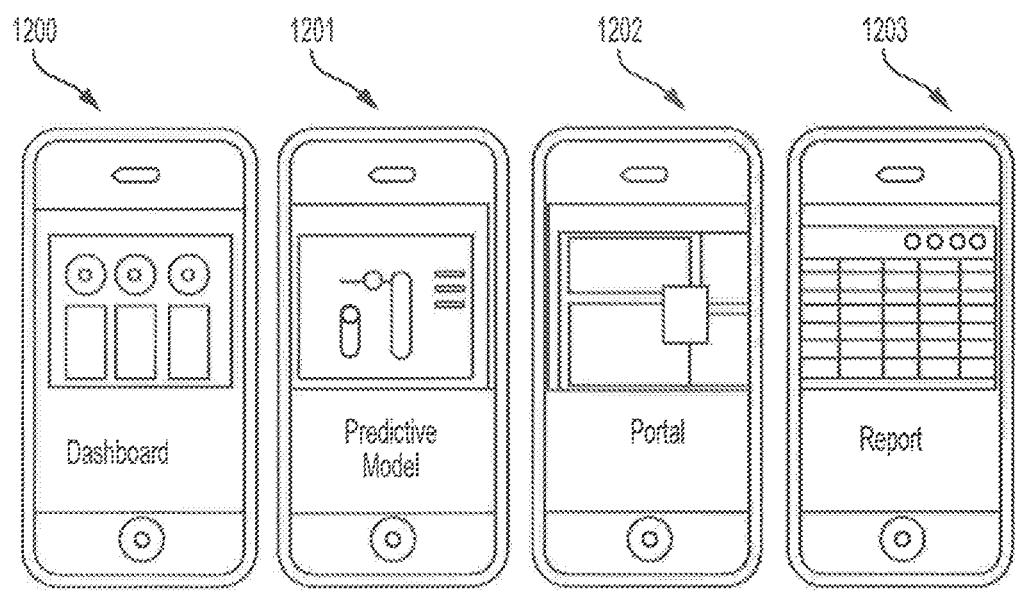
FIG. 12 shows a series of screen shots of a smart device running a software application ("App") according to an embodiment of the present invention.

FIG. 12 shows a series of screen shots 1200 through 1203, for example, on a smart device running a software application ("App") having certain features that are the same as or similar to those discussed above. The four exemplary screen shots depict a dashboard screen 1200, a predictive model screen 1201, portal screen 1202, and report screen 1203. For example, the dashboard screen 1200 may illustrate an operation of the software application that allows for the viewing of real-time or substantially real-time data input while the amusement park or other venue is in service. Such operation may allow for a user to quickly determine where a problem or potential problem exists in the venue (e.g., abnormally lengthy ride times, a spike in customer dissatisfaction, etc.) that may then be addressed immediately while the amusement park or other venue is still in service.

The predictive model screen 1201 may illustrate operation of the software application that provides information beyond the mere data being input into the application, but where such data has been additionally analyzed or used for the purposes of predicting future events based upon such inputs. In one example, the application may analyze ride wait times, dispatch rates, vendor or restaurant wait times, satisfaction levels, etc. in conjunction with a time of day, day of week, month of year etc. in order to determine what times, days, months, etc. require additional staff or modified operational behavior. One such example may illustrate that potential customers spend an abnormally long time in the parking lot during summer months such that additional staff for directing traffic may be desirably for such particular months, but are not needed for others. These, and any of a variety of other potential predictions, may be viewed, modified, and/or requested using the predictive model screen 1201 of the software application.

The portal screen 1202 may include links or connections to operator-specific functionality (e.g., viewing of real-time data, predictive operation, reporting operation, or any of a variety of other possible features, as discussed throughout). The portal screen 1202 may allow for interaction or viewing of data from multiple sources (e.g., multiple amusement parks linked together for better data analysis). The report screen 1203 may synthesize, compile, and/or generate easier-to-view summaries of data (e.g., either input data and/or output data such as predictions). For example, due to the extensive amount of information that may be input and/or output from the software application, the report screen 1203 may allow users to customize and view and/or see summaries of only the particular information that is desired at the time (e.g., a summary of particular financial information, guest movement information, etc.). Other features and corresponding screens may be incorporated into the software application without departing from the spirit and scope of the embodiments of the present invention.

The previously discussed mobile applications and/or amusement park systems may include features and/or operation different from those stated in the exemplary embodiments detailed above. Features and/or operation in one embodiment may also or additionally be included with features and/or operation of a separately discussed embodiment. Moreover, features may be added, removed, or executed with different operative flow from the exemplary embodiments detailed above. For example, in certain embodiments, a software application may inform a user of the best times to go to a particular amusement park, for example, during off-peak hours. In this manner, the application may be used to help amusement or water parks obtain more steady usage and provide customers with shorter wait times due to the spreading of patron population within the park over the operating hours of the park. In another example, in certain embodiments, various other technologies beyond those explicitly described herein, may be used for tracking and/or interfacing with guests for the collection and/or presentation of information without departing from the features described. In yet another example, use of data tracking information of guests as discussed may be used in conjunction with the determination of a plan and/or navigation for the guests' time at the park may be provided in one embodiment. A variety of features discussed herein may be accessible to users for additional fee or compensation or may be made available for free to all users of the application or system.

The previous description of the disclosed examples is provided to enable any person of ordinary skill in the art to make or use the disclosed methods and apparatus. Although the invention has been described in detail with reference to several embodiments, additional variations and modifications exist within the scope and spirit of the invention. Accordingly, the terminology employed throughout should be read in a non-limiting manner. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and/or methods.

The invention claimed is:

1. A system for tracking a guest comprising:
a first sensor positioned in range of a first location in an amusement park;
a second sensor positioned in range of a second location in an amusement park;
a storage device in communication with the first sensor and the second sensor, the storage device configured to store tracking data corresponding to the guest being sensed at the amusement park by the first sensor and the second sensor;
at least one interactive interface configured to be physically interacted with by the guest to collect a first satisfaction feedback from a guest before the guest arrives at an amusement park, a second satisfaction feedback from the guest while the guest is at an amusement park, and a third satisfaction feedback from the guest after the guest has left an amusement park; and
a server in communication with the at least one interactive interface, the server configured to store the first, second, and third satisfaction feedback provided by the guest, and
one or more processors in communication with the server, having stored thereon a set of instructions that when executed, the one or more processors are configured to:
communicate with the server, to determine whether to issue a reward to the guest based upon the first satisfaction feedback provided by the guest, the second satisfaction feedback provided by the guest, and the third satisfaction feedback provided by the guest, wherein the reward comprises dynamic alteration of one or more features of the entertainment attraction;
store the tracking data corresponding to the guest being sensed at the first location by the first sensor and at the second location by the second sensor;
store a user account associated with the guest in the storage device to associate the reward to the user account.

2. The system of claim 1 wherein the at least one interactive interface comprises a touch screen for interaction by the guest.

3. The system of claim 1 wherein the at least one interactive interface is configured to offer a purchase to the guest.

4. The system of claim 1 wherein the at least one interactive interface comprises a first interactive interface and a second interactive interface in communication with each other.

5. The system of claim 4 wherein the first interactive interface is configured to receive a message from the guest and transmit the message to the second interactive interface.

6. The system of claim 1 wherein the first sensor is a camera.

7. The system of claim 6, wherein the first sensor is capable of capturing an image of a guest and analyzing the captured image of the guest to determine a perceived mood of the guest.

8. The system of claim 7, wherein the one or more processors are further configured to generate a report corresponding to the perceived mood of the guest.

9. The system of claim 1 wherein the first sensor is a radio frequency identification (RFID) reader.

10. The system of claim 1, wherein a first guest is permitted to trade a reward with a second guest by associating the reward from a user account of the first guest to a user account of the second guest stored in the storage device.

11. A system for tracking a guest comprising:
a first interactive interface configured to be physically interacted with by the guest to collect a first satisfaction feedback from a guest, the first interactive interface positioned proximate to a queue line to an entertainment attraction;
an image sensor capable of capturing an image of a guest captured while the guest experiences the entertainment attraction and analyzing the captured image of the guest to determine a perceived mood of the guest;
a second interactive interface configured to be physically interacted with by the guest to collect a second satisfaction feedback from the guest, the second interactive interface positioned proximate to an exit area of the entertainment attraction;
a server in communication with the first interactive interface, the image sensor, and the second interactive interface, the storage device configured to store data corresponding to the first satisfaction feedback provided by the guest, the perceived mood of the guest sensed by the sensor, and the second satisfaction feedback provided by the guest; and
one or more processors in communication with the server, having stored thereon a set of instructions that when executed, the one or more processors are configured to:
communicate with the server, to determine whether to issue a reward to the guest based upon the first satisfaction feedback provided by the guest, the second satisfaction feedback provided by the guest, and the perceived mood of the guest sensed by the sensor, wherein the reward comprises dynamic alteration of one or more features of the entertainment attraction;
store tracking data corresponding to the guest using the first and second interactive interfaces;
store a user account in the storage device to associate the reward to the user account.

12. The system of claim 11 wherein the one or more processors are further configured to generate a report corresponding to the perceived mood of the guest.

13. The system of claim 11, wherein a first guest is permitted to trade a reward with a second guest by associating the reward from a user account of the first guest to a user account of the second guest stored on the server.

14. The system of claim 11 wherein the first and second interactive interfaces comprise a touch screen for interaction by the guest.

15. A system for tracking a guest comprising:
a first interactive interface configured to be physically interacted with by the guest to collect first satisfaction feedback from a guest, the first interactive interface positioned proximate to a queue line to an entertainment attraction;
a second interactive interface configured to be physically interacted with by the guest to collect a second satisfaction feedback from the guest while the guest is experiencing the entertainment attraction;
a third interactive interface configured to be physically interacted with by the guest to collect a third satisfaction feedback from the guest, the third interactive interface positioned proximate to an exit area of the entertainment attraction;
a server in communication with the first interactive interface, the second interactive interface, and the third interactive interface, the storage device configured to store data corresponding to the first satisfaction feedback, the second satisfaction feedback, and the third satisfaction feedback; and
one or more processors in communication with the server, having stored thereon a set of instructions that when executed, the one or more processors are configured to:
communicate with the server, to determine whether to issue a reward to the guest based upon the first satisfaction feedback provided by the guest, the second satisfaction feedback provided by the guest, and the third satisfaction feedback provided by the guest, wherein the reward comprises dynamic alteration of one or more features of the entertainment attraction;
store tracking data corresponding to the guest using at least one of the first, second, and third interactive interfaces;
store a user account in the storage device to associate the reward to the user account.

16. The system of claim 15 wherein at least one of the first, second, or third interactive interfaces is configured to offer a purchase to the guest.

17. The system of claim 15 wherein the first interactive interface is configured to receive a message from the guest and transmit the message to the third interactive interface.

18. The system of claim 15, wherein a first guest is permitted to trade a reward with a second guest by associating the reward from a user account of the first guest to a user account of the second guest stored in the storage device.

19. The system of claim 15 wherein each of the first, second, and third interactive interfaces comprise a touch screen for interaction by the guest.

20. The system of claim 1, wherein the reward is based upon the one or more features of the entertainment attraction.

\* \* \* \* \*